United States Patent
Claveau et al.

(10) Patent No.: US 9,965,870 B2
(45) Date of Patent: May 8, 2018

(54) CAMERA CALIBRATION METHOD USING A CALIBRATION TARGET

(71) Applicant: INSTITUT NATIONAL D'OPTIQUE, Québec (CA)

(72) Inventors: Fabien Claveau, Québec (CA); Éric Samson, Québec (CA); Yannick Cadoret, Québec (CA); Donald Prévost, Québec (CA); Louis St-Laurent, Québec (CA); Maxim Mikhnevich, Québec (CA)

(73) Assignee: INSTITUT NATIONAL D'OPTIQUE, Quebec, Quebec (CA)

( * ) Notice: Subject to any disclaimer, the term of this patent is extended or adjusted under 35 U.S.C. 154(b) by 0 days. days.

(21) Appl. No.: 15/467,872

(22) Filed: Mar. 23, 2017

(65) Prior Publication Data

US 2017/0287166 A1    Oct. 5, 2017

Related U.S. Application Data

(60) Provisional application No. 62/314,580, filed on Mar. 29, 2016.

(51) Int. Cl.
*H04N 17/02* (2006.01)
*G06T 7/80* (2017.01)
*H04N 17/00* (2006.01)

(52) U.S. Cl.
CPC .............. *G06T 7/80* (2017.01); *H04N 17/002* (2013.01)

(58) Field of Classification Search
CPC ................................ H04N 17/002; G06T 7/80
USPC ......................................................... 348/187
See application file for complete search history.

(56) References Cited

U.S. PATENT DOCUMENTS

| | | | |
|---|---|---|---|
| 6,437,823 B1 | 8/2002 | Zhang | |
| 8,760,521 B2 | 6/2014 | Medeiros et al. | |
| 2013/0321589 A1 | 12/2013 | Kirk et al. | |
| 2014/0285676 A1* | 9/2014 | Barreto | H04N 17/002 |
| | | | 348/187 |
| 2015/0130951 A1 | 5/2015 | Olson et al. | |
| 2017/0221210 A1* | 8/2017 | Martinello | G06T 7/0012 |
| | | | 382/128 |

(Continued)

OTHER PUBLICATIONS

Bouguet, Jean-Yves, "Camera Calibration Toolbox for Matlab", Oct. 2015, http://www.vision.caltech.edu/bouguetj/calib_doc/.

*Primary Examiner* — Michael Lee
(74) *Attorney, Agent, or Firm* — Merchant & Gould P.C.

(57) ABSTRACT

Calibration methods use a calibration target for obtaining the intrinsic and extrinsic camera parameters of one or more cameras are. The methods can include acquiring, with each camera, a sequence of target images representing the calibration target in different target poses and at different acquisition times. The methods can include identifying reference images from the target images, and defining volume bins, angle bins and multi-camera bins into which the reference images are stored. The reference images can be used to determine the intrinsic and extrinsic parameters of the one or more cameras. In some implementations, the calibration methods can enable a user to monitor the progress of the calibration process, for example by providing an interactive calibration target including an input/output user interface to guide the user in real-time during the acquisition of the target images and/or sensors to provide positional information about the target poses.

25 Claims, 20 Drawing Sheets

(56) References Cited

U.S. PATENT DOCUMENTS

2017/0221226 A1* 8/2017 Shen .................. G06T 7/80
348/188

* cited by examiner

CAMERA CALIBRATION METHOD USING A CALIBRATION TARGET

RELATED PATENT APPLICATION

The present application claims priority benefit of U.S. provisional patent application No. 62/314,580 filed on Mar. 29, 2016, the disclosure of which is incorporated herein by reference in its entirety.

TECHNICAL FIELD

The technical field generally relates to camera calibration techniques and, more particularly, to an interactive camera calibration method and an image acquisition and analysis scheme for use in the same.

BACKGROUND

Geometric camera calibration, or simply camera calibration, is used in several applications, notably in the field of computer vision, to allow three-dimensional (3D) metric information to be extracted from two-dimensional (2D) images. Non-limiting exemplary applications include image registration, object positioning, volumetric 3D reconstruction, dimensional measurements, gaming, augmented-reality environments, and photogrammetry. Camera calibration is a process of estimating the intrinsic and extrinsic camera parameters based on observations of a known physical target. The intrinsic parameters of a camera relate to the internal geometry and optical characteristics of the camera itself, while the extrinsic parameters measure the location and orientation of the camera with respect to a world coordinate system in 3D space.

Conventional camera calibration techniques use one or more images of a specifically designed calibration target or object. The calibration target includes several readily detectable fiducial markers or features with known relative 3D positions. By fixing the world coordinate system in the calibration object, point correspondences between 3D world points and 2D image points can be established. The intrinsic and extrinsic camera parameters can be computed by solving the system of equations resulting from these point correspondences.

Calibration methods can be divided into several categories. For example, according to the calibration object that they use, they can be classified into four categories: (i) 3D reference object based calibration, where camera calibration is performed by observing a calibration object whose geometry in 3D space is known with very good precision; (ii) 2D plane based calibration, where camera calibration involves the observation at different orientations of a planar calibration object having a calibration pattern thereon, but without requiring a priori knowledge of the 3D position of the calibration object at each orientation; (iii) one-dimensional (1D) based calibration, where the calibration objects are composed of a set of collinear points; and (iv) self-calibration, which does not use any calibration object.

Although various camera calibration techniques have been developed, numerous challenges remain, notably in terms of relieving the user from fastidious manual tasks, limiting the number of parameters and thresholds that need to be adjusted, allowing a real-time calibration to be performed, reducing calibration time; improving the ease of use for the user.

SUMMARY

The present description generally relates to camera calibration techniques for determining the intrinsic and extrinsic camera parameters of one or more cameras.

In accordance with an aspect, there is provided a method for intrinsic calibration of a camera using a calibration target, the camera having a field of view covering a scene. The method includes the steps of:
 providing a plurality of target images acquired with the camera, each target image representing a view of the calibration target in a respective one of a plurality of target poses, each target pose corresponding to a certain location and orientation of the calibration target relative to the camera;
 partitioning a volume of interest of the scene into a set of volume bins;
 defining a set of angle bins, each angle bin encompassing a respective range of possible orientation values for the calibration target;
 identifying, among the plurality of target images, reference images of the calibration target;
 assigning each reference image to either or both of one of the volume bins and one of the angle bins based on the respective target pose corresponding to the reference image; and
 obtaining intrinsic camera parameters based on the reference images.

In some implementations, the providing step includes: acquiring, with the camera, the plurality of target images of the calibration target in the respective plurality of target poses; and displacing the calibration target across the scene between acquiring successive ones of the plurality of target images. In some implementations, the plurality of target images of the calibration target can be acquired as one or more video streams.

In some implementations, the providing, identifying and assigning steps are performed at least partly concurrently with one another.

In some implementations, the method provides an interactive camera calibration process for determining the intrinsic camera parameters. For example, the method can allow the user to be accompanied throughout the calibration process of the camera quickly and efficiently.

In some implementations, the method can enable the user to assess and monitor the progress of the calibration process. For example, the method can include a step of monitoring, in real-time, a current number of reference images assigned to each one of the volume bins and each one of the angle bins. In some implementations, the method further includes a step of communicating filling-level information related to the current numbers of reference images assigned to the volume and angle bins.

In some implementations, a real-time interaction is made possible by providing an interactive calibration target in communication with a processing unit that performs the assignment of the qualified target poses to the respective volume and angle bins. The interactive calibration target can inform the user of the progress of the calibration and generally provides guidance during the image data capture. For example, the method can produce a mapping of the current distribution of the images in the different bins and communicate this information, and current performance indicators, to the interactive target to inform the user. As such, the user moving the target within the scene to acquire the various target poses can be continuously informed about the volume and angle bins that have been populated with enough reference images and the volume and angle bins that remain to be filled with reference images. Accordingly, the user can focus on populating those remaining volume and angle bins, thus improving the efficiency and execution time of the image acquisition and analysis process. In some implementations, the interactive calibration method can determine and inform the user on the most efficient order in which to acquire the target image, that is, the order requiring the least amount of time and movement.

In such interactive implementations, the method can include, during the providing step, a step of measuring at least one of location information and orientation information about the calibration target with at least one sensor mounted on the calibration target. In such implementations, the assigning step includes determining at least one of the location and the orientation of the calibration target corresponding to each reference image based on the at least one of the location information and orientation information measured by the at least one sensor. In other such interactive implementations, the communicating step can include displaying the filling-level information on a visual display mounted on the calibration target. In some implementations, the displacing step is performed based on the filling-level information.

In some implementations, such an interactive calibration target can include a tablet computer display mounted to the calibration target and including a visual display. In such implementations, position, distance, orientation and other motion sensors can be integrated in or to the tablet computer to provide an alternative way of determining the pose of the target. The information collected by the tablet sensors can be fused or merged with software data to improve the robustness of the pose estimation. In some implementations, the provision of an interactive target can allow a single operator to both control the calibration process and manipulate the target in the scene.

In some implementations, the providing, identifying and assigning steps are performed until, for each one of the volume bins and each one of the angle bins, the current number of assigned reference images reaches a respective predetermined threshold amount.

In some implementations, the obtaining step is performed iteratively and at least partly concurrently with the providing, identifying and assigning steps. In such implementations, the intrinsic camera parameters are calculated iteratively as new target images are captured from which new reference images are obtained and incrementally assigned to the volume and angle bins for use in the calibration calculations. In such implementations, image capture and calibration calculations can be integrated into a single dynamic, iterative and incremental process.

In some implementations, the obtaining step includes a step of determining a calibration error associated with the intrinsic camera parameters, and the providing, identifying, assigning and obtaining steps are performed until the calibration error gets lower than a predetermined error value.

In some implementations, the method can include preliminary steps of: acquiring a series of initial images of the calibration target at different initial target poses; and obtaining initial estimates for the intrinsic camera parameters based on the series of initial images. In some implementations, the assigning step is performed based on the initial estimates for the intrinsic camera parameters.

In some implementations, the calibration target has a planar calibration surface (e.g., of rectangular shape) having a known calibration pattern thereon. In such implementations, the orientation of the calibration target can be defined by the angle made between the planar calibration surface and a plane normal to the optical axis of the camera. In some implementations, the calibration pattern is a checkerboard pattern or a dot matrix.

In some implementations, the target images can be analyzed using various criteria to keep only those images whose quality is considered adequate. In some implementations, the identifying step includes, for at least one of the target images: searching the calibration target in the target image; if the calibration target is found, evaluating at least one image quality parameter of the target image; and if each image quality parameter meets a respective quality criterion, classifying the target image as one of the reference images. In some implementations, the searching step includes looking for one or more fiducial features or markers on the calibration target. In some implementations, the evaluating step includes assessing at least one of a level of contrast, a level of saturation and a level of blur of the target image.

In some implementations, the assigning step includes, for at least one of the reference images, determining the respective target pose based on a pixel-based location of the calibration target in the reference image.

In some implementations, it can be desirable that the captured target poses cover as much of the volume of interest of the view frustum of the camera as possible. In such implementations, it can be advantageous that the volume bins span the field of view of the camera.

In some implementations, the method can alter, in real-time, the number and/or distribution of the volume and angle bins in accordance with the progress of the calibration process and/or in accordance with one or more predetermined performance criteria, for example a quality indicator of the camera calibration provided by the user.

In accordance with another aspect, there is provided a method of extrinsic calibration of a network of cameras using a calibration target, each camera of the network having a field of view that covers a portion of a scene and partially overlaps the field of view of at least another camera of the network. The method includes the steps of:

providing, for each camera, a plurality of target images acquired with the camera, each target image representing a view of the calibration target in a respective one of a plurality of target poses and at a respective one of a plurality of acquisition times;

defining at least one multi-camera bin, each multi-camera bin being associated with two or more of the cameras of the network, the two or more cameras having partially overlapping fields of view;

identifying, for each camera, qualified target images among the plurality of target images;

for each multi-camera bin:
  assigning sets of multi-camera reference images to the multi-camera bin, the multi-camera reference images in each set having a same acquisition time and consisting of one of the qualified target images acquired by each one of the two or more associated cameras; and
  obtaining, for each one of the two or more associated cameras and based on the multi-camera reference images, estimates of extrinsic camera parameters in a bin reference frame associated with the multi-camera bin; and if the at least one multi-camera bin consists of more than one multi-camera bin, obtaining, for each camera of the network and based on the estimates of the extrinsic camera parameters obtained for every camera of the network, calibrated values of the extrinsic camera parameters in a same global reference frame; otherwise, using, for each camera of the network, the estimates of the extrinsic camera parameters as the calibrated values of the extrinsic camera parameters.

In some implementations, the providing step is performed at least partly concurrently for all cameras of the network and includes, for each camera, the steps of: acquiring, with the camera, the plurality of target images of the calibration target; and displacing the calibration target between acquiring successive ones of the plurality of target images.

In some implementations, the method further includes, during the providing step, a step of measuring at least one of location information and orientation information about the calibration target with at least one sensor mounted on the calibration target, and wherein, for each multi-camera bin, the assigning step includes assigning the sets of multi-camera reference images to the multi-camera bin based on the at least one of the location information and orientation information measured by the at least one sensor.

In some implementations, for each multi-camera bin, the providing, identifying and assigning steps are performed at least partly concurrently with one another.

In some implementations, the method further includes a step of monitoring, in real-time, a current number of sets of multi-camera reference images assigned to each multi-camera bin. In some implementations, the method further includes a step of communicating filling-level information related to the current number of sets of multi-camera reference images assigned to each multi-camera bin. In some implementations, the communicating step includes displaying the filling-level information on a visual display mounted on the calibration target.

In some implementations, the method further includes the steps of: assigning, for each multi-camera bin, sets of validation images to the multi-camera bin, the validation images in each set having a same acquisition time and consisting of one of the qualified target images acquired by each one of the two or more associated cameras, the validation images being different from the multi-camera reference images; and validating the calibrated values of the extrinsic camera parameters based on the validation images.

In some implementations, each multi-camera bin is a two-camera bin associated with two of the cameras of the network. In some implementations, the network of cameras includes more than two cameras. In some implementations, the network includes more than two multi-camera bins.

In some implementations, the method further includes a step of determining intrinsic camera parameters of each camera of the network, including, for each camera, the steps of: partitioning a volume of interest of the scene into a set of volume bins; defining a set of angle bins, each angle bin encompassing a respective range of possible orientation values for the calibration target; identifying, among the qualified target images, single-camera reference images of the calibration target; assigning each single-camera reference image to either or both of one of the volume bins and one of the angle bins based on the respective target pose corresponding to the single-camera reference image; and obtaining the intrinsic camera parameters based on the single-camera reference images.

In some implementations, the present techniques can automate one or more of the following actions: the continuous capture of target images by the cameras; the target detection in the captured images; the validation of the target detection; the mapping of the current target image with the appropriate volume and angle bins; the formation of sets of reference images and/or validation images; the estimation of intrinsic and extrinsic calibration parameters from the reference images; and the calculation of performance indicators from the validation images. In some implementations, the present techniques integrate in one tool all key aspects of the calibration process. In some implementations, the process is automated and can allow calibrating a camera system in a matter of minutes. In some implementations, the present techniques can involve one or more of the following actions or steps: providing positional information about the target poses acquired by sensors mounted on the calibration target; displaying the filled and unfilled bins superimposed on the image of the camera (augmented reality); and displaying the filled and unfilled bins schematically in a 3D virtual space. In some implementations, the present techniques can provide a dynamic selection of the camera video stream or streams to be displayed by the electronic device mounted on the calibration target based on target segmentation; Optionally, this feature can allow automatically and dynamically selecting, among the video streams from all the cameras to be calibrated, the one or more video streams that are deemed the most relevant to the user manipulating the calibration target in view of the volume and angle bins left to be filled and/or the position of the target within the scene.

In some implementations, the calibration target is held and moved by a human operator during the acquisition of the plurality of target images with varying locations and/or orientations relative to the camera. However, in other implementations, the movement of the calibration target within the scene during the image acquisition process can be accomplished by a robot operator or another automated machine.

In some implementations, the calibration method considers both the camera calibration parameters and the spatial and angular distribution of the reference images of the target used in the calibration process. This can ensure or help ensure that the camera calibration is satisfactory across the field of view of the cameras, and that the user is informed of the progress of the capture of the spatially and angularly distributed reference images.

In accordance with another aspect, there is provided an image acquisition and analysis process for camera calibration. The image acquisition and analysis process, or imaging process for simplicity, can involve acquiring, for each camera being calibrated, a set of reference images of a calibration target having a known calibration pattern provided thereon. The set of reference images associated with each camera represents the calibration target as viewed by the camera from different orientations and locations in object space. Each set of reference images can be used to calibrate its corresponding camera, that is, to determine the intrinsic and extrinsic parameters of the camera.

In accordance with another aspect, there is provided a camera calibration system. The system can include: (i) one or more cameras disposed relative to a real-world scene to provide corresponding one or more images or video streams of the real-world scene from one or more of physical viewpoints; (ii) a calibration target having a calibration pattern, for example a planar rectangular checkerboard calibration target such as described above; and (iii) a processing unit operatively connected to each video camera and configured to receive therefrom the video stream of the real-world scene, the processing unit including or being coupled to a computer readable memory storing computer executable instructions thereon that, when executed by the processing unit can perform various steps of the method disclosed herein.

In accordance with another aspect, there is provided a computer readable memory storing computer executable instructions thereon that, when executed by a computer, can perform various steps of methods disclosed herein.

In accordance with another aspect, there is provided a calibration target as disclosed herein. In some implementations, the calibration target can include a plate-shaped base or structure having a planar calibration surface having a known calibration pattern thereon, for example a checkerboard pattern or a dot matrix. The calibration target can also include at least one sensor (e.g., mounted on the plate-shaped base on the surface opposite the planar calibration surface exposed to the camera) to measure location information and/or orientation information about the calibration target during the calibration process. The calibration target can also include a visual display for displaying information about the calibration process.

It is noted that other method and process steps may be performed prior, during or after the above-described steps. The order of one or more of the steps may also differ, and some of the steps may be omitted, repeated and/or combined, depending on the application.

Other features and advantages of the present description will become more apparent upon reading of the following non-restrictive description of specific embodiments thereof, given by way of example only with reference to the appended drawings.

DETAILED DESCRIPTION

Figure 1A:
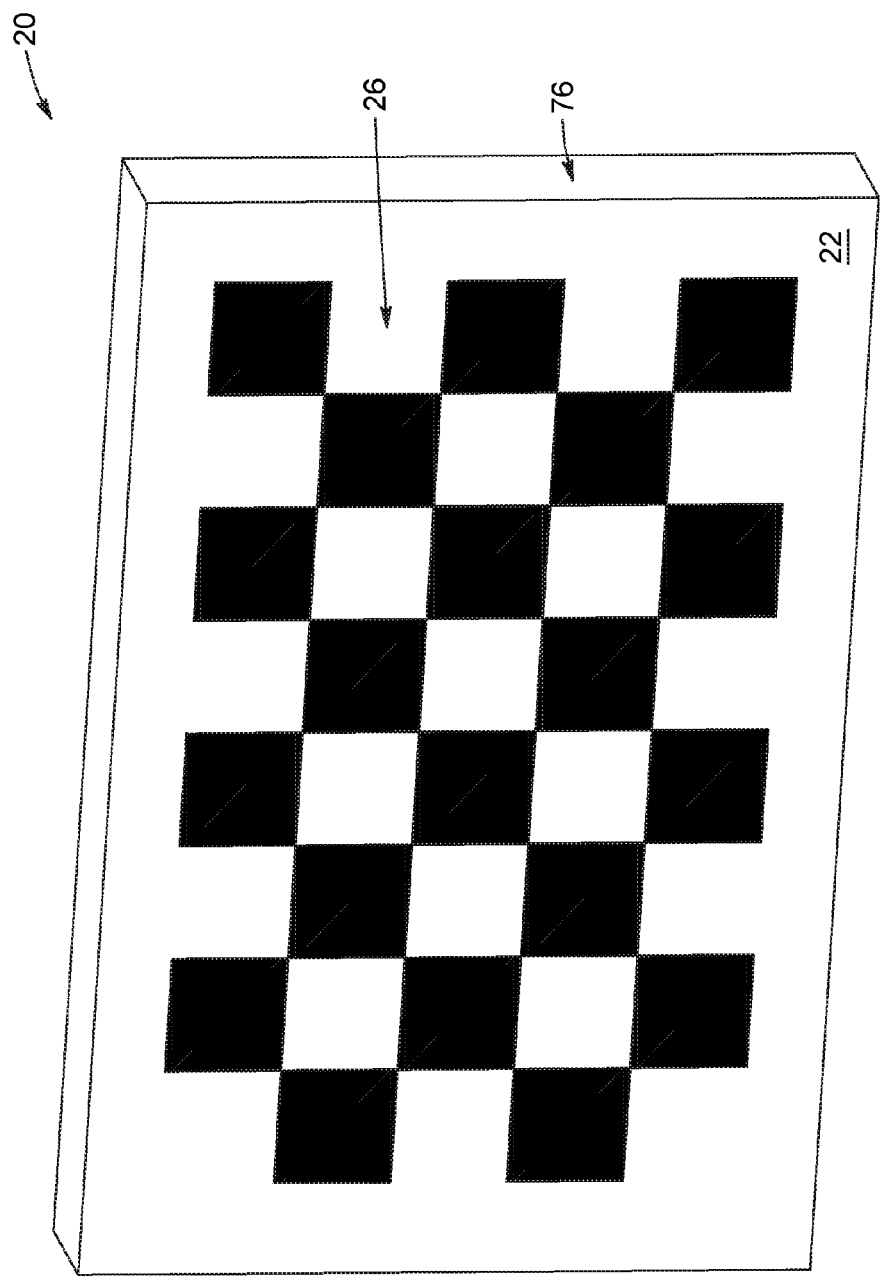
FIG. 1A is a schematic representation of the front side of a planar calibration target that can be used for camera calibration. The front side has a checkerboard calibration pattern thereon.

In the following description, similar features in the drawings have been given similar reference numerals, and, to not unduly encumber the figures, some elements may not be indicated on some figures if they were already identified in one or more preceding figures. The elements of the drawings are also not necessarily depicted to scale, since emphasis is placed upon clearly illustrating the elements and structures of the present embodiments.

The present description generally relates to camera calibration techniques, and more particularly to an image acquisition and analysis process for camera calibration. The image acquisition and analysis process, or imaging process for brevity, can involve capturing, for each camera being or to be calibrated, a set of reference images of a calibration target having a known calibration pattern provided thereon. The set of reference images associated with each camera represents the calibration target viewed from different locations and orientations in 3D space. Each set of reference images can be used to calibrate its corresponding camera, that is, to determine the intrinsic and extrinsic parameters of the camera.

In the present description, the terms "location" and "orientation" refer respectively to the spatial and angular coordinates of an object in a 3D coordinate system. The term "position" and derivatives thereof can refer to any of the location, the orientation, or both the location and the orientation of an object.

In the present description, the term "concurrently" is used to describe two or more events that occur in overlapping time periods. Depending on the application, the two or more events may be fully or partially overlapping in time. More particularly, when there are more than two events, some pairs of events may be fully overlapping in time, while other pairs of events may be partially overlapping in time.

The present techniques can be useful in various applications that require or can benefit from an enhanced calibration method to obtain the intrinsic and extrinsic parameters of one or more cameras disposed around a scene in a flexible and interactive manner. For example, the present techniques can be applied to or implemented in various types of camera systems, including, without limitation, systems used in image registration, robotics, navigation systems, telepresence, computer graphics, object positioning, machine vision, 3D scene reconstruction, and photogrammetry.

Geometric camera calibration is a process of estimating relevant parameters of an image or video camera. The camera parameters map 3D points in the object space to 2D points in the image plane. Such a mapping can be referred to as a camera model. Examples of camera models include the pinhole camera model and more sophisticated models that consider, for example, radial and tangential lens distortion. Camera models use perspective transformations to provide a mapping between an external 3D world coordinate system and the projection of this world coordinate system into a pixel-based 2D image coordinate system. Perspective transformations are generally represented by a 3×4 projection matrix that incorporates both the intrinsic and extrinsic camera parameters. The 3D world coordinates are converted to 3D camera coordinates using the extrinsic parameters and the 3D camera coordinates are mapped into 2D image coordinates using the intrinsic parameters.

The intrinsic camera parameters describe the internal geometric and optical characteristics of the camera itself. The intrinsic parameters can include, without limitation, the focal length, the coordinates of the principal point, the scale factors and the skew factors. The extrinsic parameters describe the coordinate system transformation (i.e., translation and rotation) between the world coordinate system and the camera coordinate system. The extrinsic parameters can include, without limitation, the distance and relative angle between the world reference frame and the camera reference frame. Knowledge of the intrinsic and extrinsic camera parameters is required to use a camera model and can be achieved by camera calibration. Camera calibration can involve acquiring multiple reference images of a calibration target from different distances and angles with respect to the camera to establish a mapping between 3D world points and the corresponding 2D images points, and performing a calibration calculation based on these correspondences.

Depending on the application, the present techniques can be used to calibrate both single- and multi-camera configurations. For example, the present techniques can be used to calibrate a network of cameras disposed around a real-world scene to provide a corresponding plurality of images or video streams of the real-world scene from a respective plurality of physical viewpoints. In the present description, the term "viewpoint" refers to a position, describable in a six-parameter space (i.e. three spatial or translational coordinates and three angular or rotational coordinates), where a camera would be to view a scene. In the case of video cameras, the cameras can preferably be synchronized externally to ensure that the corresponding plurality of video streams is correctly registered in time. The number and arrangement of the pluralities of cameras around the real-world scene can vary depending on the intended use and requirements of the multi-camera system.

In the present description, the term "camera" refers broadly to any device or combination of devices capable of acquiring and outputting images of a scene, either as still images or as a video stream. Depending on the application, different types of cameras can be used including, without limitation, most area-scan cameras. The cameras to be calibrated can be high-resolution digital cameras, although lower resolution and/or non-digital cameras can also be used. The cameras can be used in both active and passive systems. The cameras can use coherent light (e.g., scanning laser cameras and flash laser cameras), structured light (e.g., structured cameras and laser profilometers), or modulated light (e.g., time-of-flight cameras and lidar cameras), or a combination thereof. In some implementations, the cameras can be depth cameras (e.g., structured light cameras such as the first-generation Microsoft Kinect® or modulated light cameras such as time-of-flight cameras).

Cameras that can benefit from the present techniques can operate in various regions of the electromagnetic spectrum including, without limitation, the ultraviolet, visible, near-infrared (NIR), short-wavelength infrared (SWIR), mid-wavelength infrared (MWIR), long-wavelength infrared (LWIR), and terahertz (THz) wavelength ranges. For example, in some non-limiting implementations, the one or more cameras can be sensitive to light having a wavelength band lying somewhere in the range from 400 nanometers to 12 micrometers. In the present description, the terms "light" and "optical" are intended to refer to radiation in any appropriate portion of the electromagnetic spectrum.

A camera generally includes an image sensor and collecting or imaging optics. The collecting optics collects light from a scene in the field of view of the camera and directs the collected light onto the image sensor. The collecting optics can include lenses, mirrors, filters and other reflective, refractive and/or diffractive optical components. The image sensor can include an array of photosensitive pixels capable to detect electromagnetic radiation and generate an image of the scene, typically by converting the detected radiation into electrical signals. For example, the image sensor can be embodied by a complementary metal-oxide-semiconductor (CMOS) sensor, a charge-coupled device (CCD) sensor, a photodiode array, a charge-injection device, or another type of sensor array. In the present description, the term "field of view" refers to the angular extent of a scene that can be imaged by a camera.

In some implementations, the camera calibration process uses a planar calibration object or target provided with fiducial markers or other reference features on the surface thereof exposed to the cameras. However, other embodiments may use a non-planar "3D" calibration object. The fiducial markers on the calibration target can form a calibration pattern, for example a checkerboard pattern or a dot matrix. A non-limiting example of a planar calibration target 20 having a front side 22 and a rear side 24 is shown in FIGS. 1A (front side) and 1B (rear side). The front side 22 has a calibration pattern 26 thereon, which in this example is a checkerboard calibration pattern. The rear side 24 has a tablet computer 28 mounted thereto. The tablet computer 28 has a user interface 30 including a touch-sensitive surface 32 for data input and a visual display 34 for data output. As described below, the provision of a tablet computer 28 on the calibration target 20 can allow a user manipulating the calibration target 20 during image acquisition to receive live feedback about the progress of the calibration and/or instructions on where to move the target 20. Of course, depending on the application, various types of calibration targets can be used. The calibration target can have various sizes and shapes in accordance with the field(s) of view of the camera (s) and the volume covered by a given application. For example, the exposed surface of the calibration target can have linear dimensions ranging from a few centimeters to about one meter or more. In some implementations, orientation markers are present on the target, so that it may be possible to recognize the target in any direction and/or when the target is only partially present in the camera field of view, provided that at least two markers are present in the image.

In the present techniques, obtaining the intrinsic and extrinsic camera parameters to solve the calibration problem generally involves identifying so-called "reference" images among a plurality of captured images of a calibration target. Each captured image of the target, or for brevity, target image, generally represents a view of the calibration target in a specific target pose corresponding to a certain location and orientation of the calibration target relative to the camera. In the present description, the term "target pose", or simply "pose", is used to describe a specific combination of location (or distance) and orientation of the calibration target relative to the camera or another reference frame. In general, not all captured target images are selected as reference images in the calculations of the camera parameters. Characteristics of the fiducial markers such as edges, corners, and the like may be extracted from the reference images to provide a mapping between the scene plane defined by the planar calibration target and its perspective image on the image plane. Such mapping can be referred to as a "planar homography".

Figure 2:
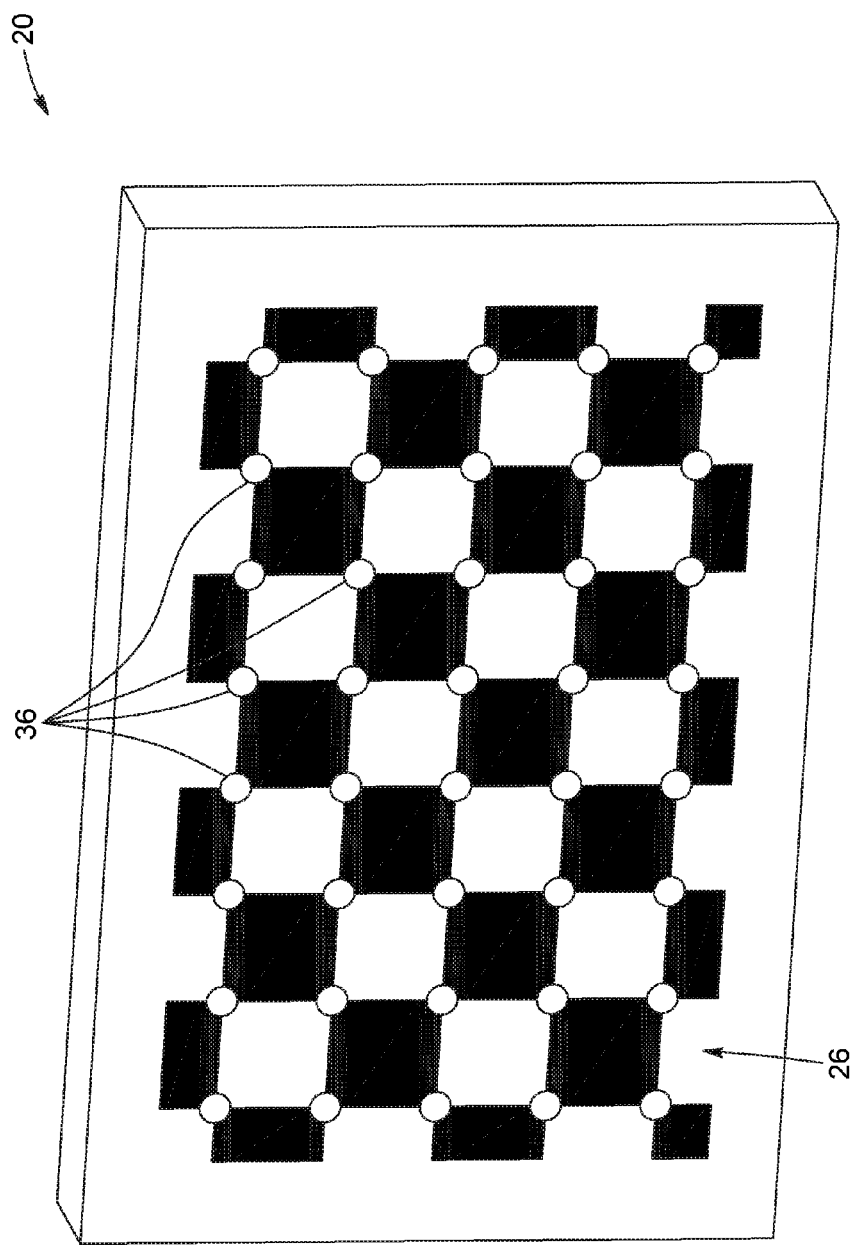
FIG. 2 is a schematic representation of the front side of a planar calibration target that can be used for camera calibration. In this example, the calibration target has a checkboard pattern having a total of 40 inner corners used as fiducial markers and identified by open circles.

In general, various feature extraction and image processing techniques can be used to detect and recognize fiducial features in captured target images. For example, referring to FIG. 2, in some implementations, the inner corners 36 of the checkerboard pattern 26 of the calibration target 20 can be detected as identifying fiducial features that provide known world points. In some implementations, corner detector algorithms can use edge detection to find fiducial markers on a checkerboard pattern, fit lines to data points, and compute line intersections to find corners. In some implementations, the minimum number of corners that must be detected to accept a target pose can be set by the user. The user may also specify that partial corner detection is acceptable.

In general, at least some physical parameters of the calibration target are assumed to be known a priori and are used as inputs in the calibration process. Of course, in other embodiments, the number and the size of the square tiles can be different. Likewise, in other embodiments, the calibration pattern can differ from a checkerboard pattern and be embodied, for example, by a dot array or another suitable pattern. The size and shape of the calibration target as well as the size and motif of the calibration pattern can be varied in accordance with various factors such as, for example, the field(s) of view of the camera(s) and/or the size of the scene volume to be covered by the application. It will be understood that, in some implementations, the size of the squares can set the scaling factor that allows measurements to be made using real units.

Figure 3:
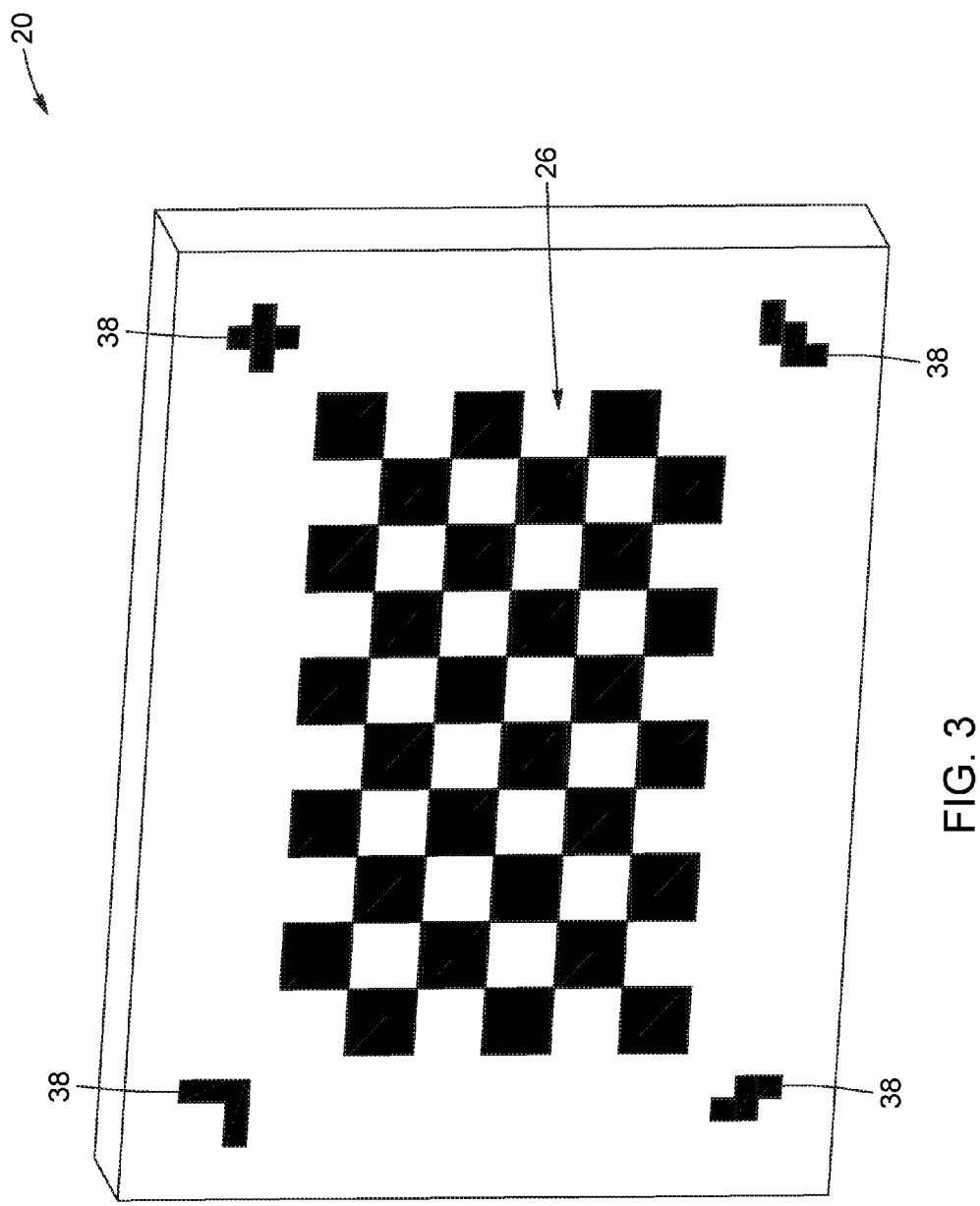
FIG. 3 is a schematic representation of the front side of a planar calibration target that can be used for camera calibration. In this example, the calibration target has a checkboard pattern and a different polygonal marker at each of its four corners.
Figure 4A:
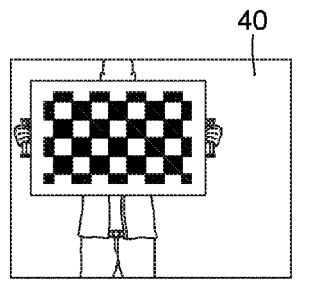
FIGS. 4A to 4I depict a series of nine target images representing nine target poses that together spatially cover the field of view of a camera and that can be used as reference images for calibration calculations.
Figure 4B:
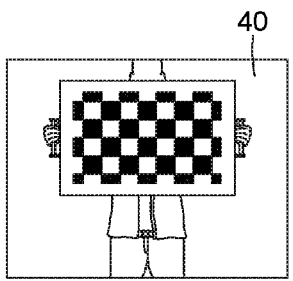
Figure 4C:
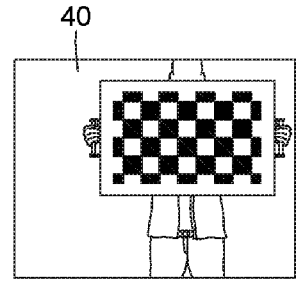
Figure 4D:
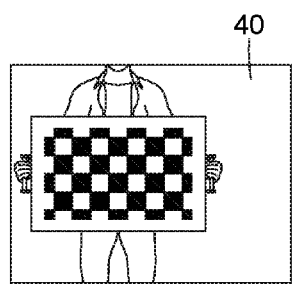
Figure 4E:
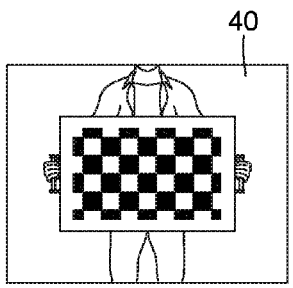
Figure 4F:
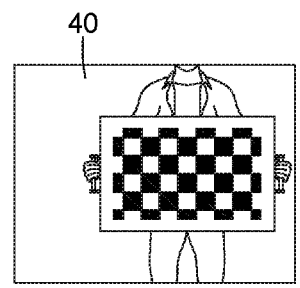
Figure 4G:
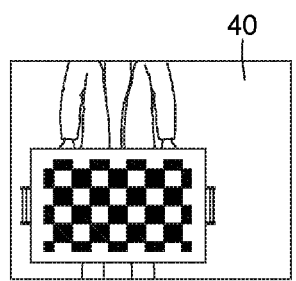
Figure 4H:
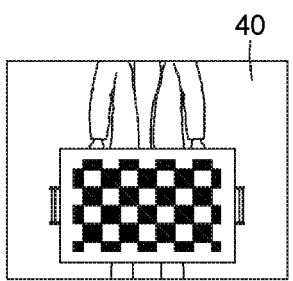
Figure 4I:
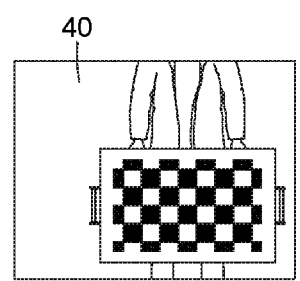

In some implementations, the fiducial markers can also include orientation markers. Orientation markers can allow the calibration target to be recognized in any orientation and/or when the calibration target is only partially present in the field of view of a camera, provided that at least two orientation markers are present in the target image. That is, once the at least two orientations makers are detected, it is possible to define and position a 2D target reference frame on the target image, which can be advantageous in the case of multi-camera networks. For example, FIG. 3 depicts a rectangular plate-shaped calibration target 20 having a checkerboard calibration pattern 26 and including four polygonal markers 38.

As described below, some implementations of the present techniques can provide a camera calibration method, which involves acquiring and determining, for each camera being calibrated, various sets of reference images of a calibration target having a known calibration pattern or features provided thereon. In some implementations, non-limiting principles, rules or guidelines to improve camera calibration accuracy can be followed when acquiring the target images from which reference images are defined and used in the calibration calculations.

First, it can be desirable or even necessary that the captured target poses be distributed as much as possible across the entire camera image since target poses that span the field of view generally yield better results, especially when the camera exhibits lens distortion. In other words, this means that, in some implementations, the location of the calibration target in the different reference images is distributed as much as possible across the field of view of the camera. Referring to FIGS. 4A to 4I, there is shown an example of a series of nine target images 40 representing nine target poses that together span the field of view of the camera and that can be used as reference images for calibration calculations, in accordance with a possible embodiment.

Figure 5:
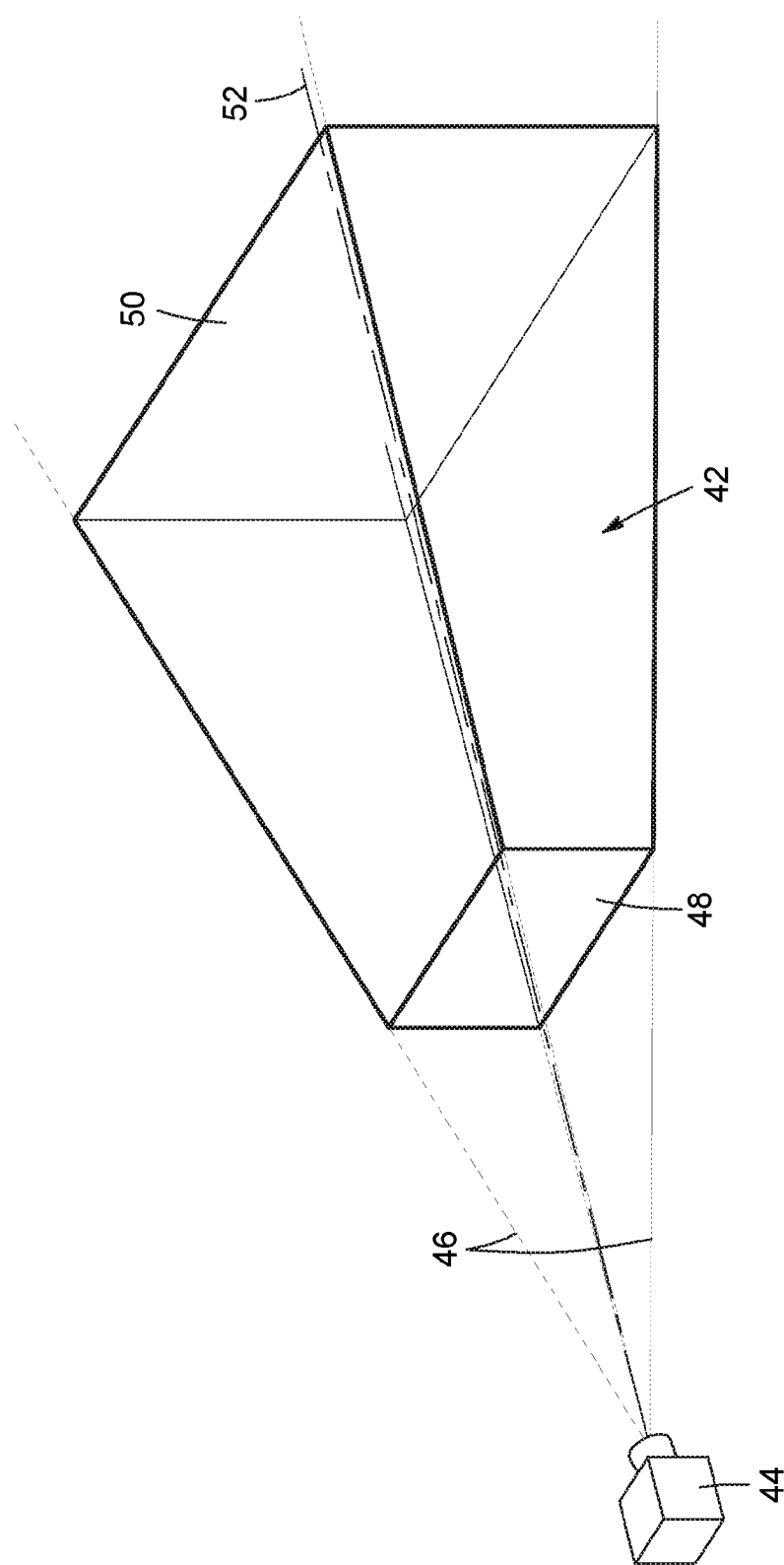
FIG. 5 is a schematic representation of the viewing frustum of a camera.

Second, it can also be desirable or even necessary that the captured target poses cover a significant portion of the volume of interest of the viewing frustum of the camera. The volume of interest can be defined depending on the intended application. It may also be desirable to have observations of the calibration target that are well distributed across the volume of interest. The term "viewing frustum" or "view frustum" refers herein to a volume of space in a scene that can be seen or captured from a certain viewpoint and, more particularly, to the volume of space in a scene that is projected onto the image plane of a camera. Referring to FIG. 5, the viewing frustum 42 of a camera 44 is delimited laterally by the field of view 46 of the camera 44 and longitudinally by a front (or near) clipping plane 48 and a back (or far) clipping plane 50 specified in depth coordinates. The front and back clipping planes 48, 50 are generally perpendicular to the optical or imaging axis 52 of the camera 44. As also shown in FIG. 5, the viewing frustum 42 generally takes the shape of a truncated pyramid or cone, hence the name frustum.

Third, it can further be desirable or even necessary that the calibration target be captured in different orientations with respect to each camera and, more particularly, that target poses with an out-of-plane angle be part of the capture session. More specifically, it can be advantageous or required not to limit the reference images to fronto-parallel poses, that is, target poses where the exposed surface of the calibration target is perpendicular to the optical axis of the camera. For example, in some implementations, it can be desirable that the range of possible angle values of at least one of the angle bins includes angles greater in absolute values than 20°.

Various non-limiting exemplary implementations of camera calibration methods will now be described.

Calibration Method for Obtaining Intrinsic Camera Parameters

Figure 6:
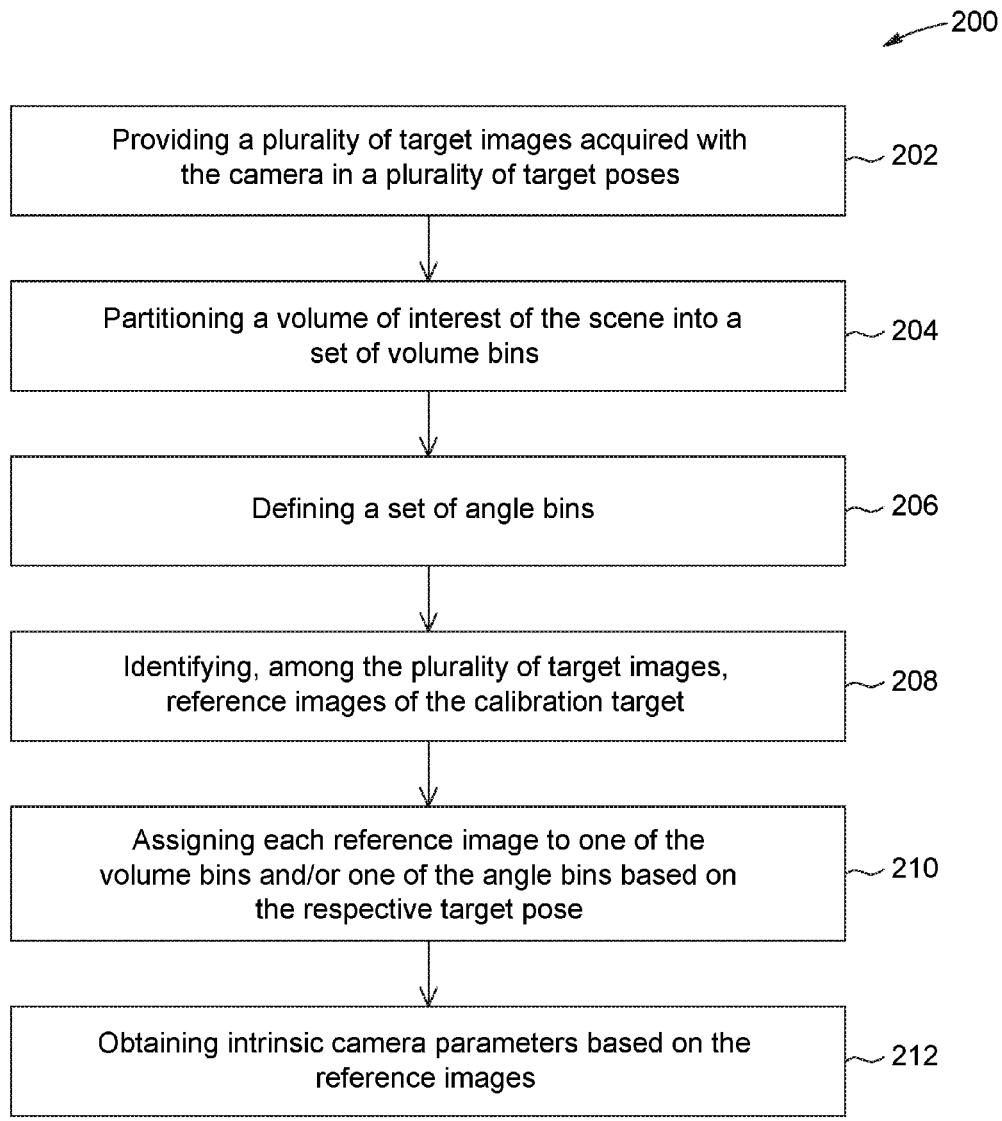
FIG. 6 is a flow diagram of a method of intrinsic calibration of a camera using a calibration target, in accordance with an embodiment.
Figure 7:
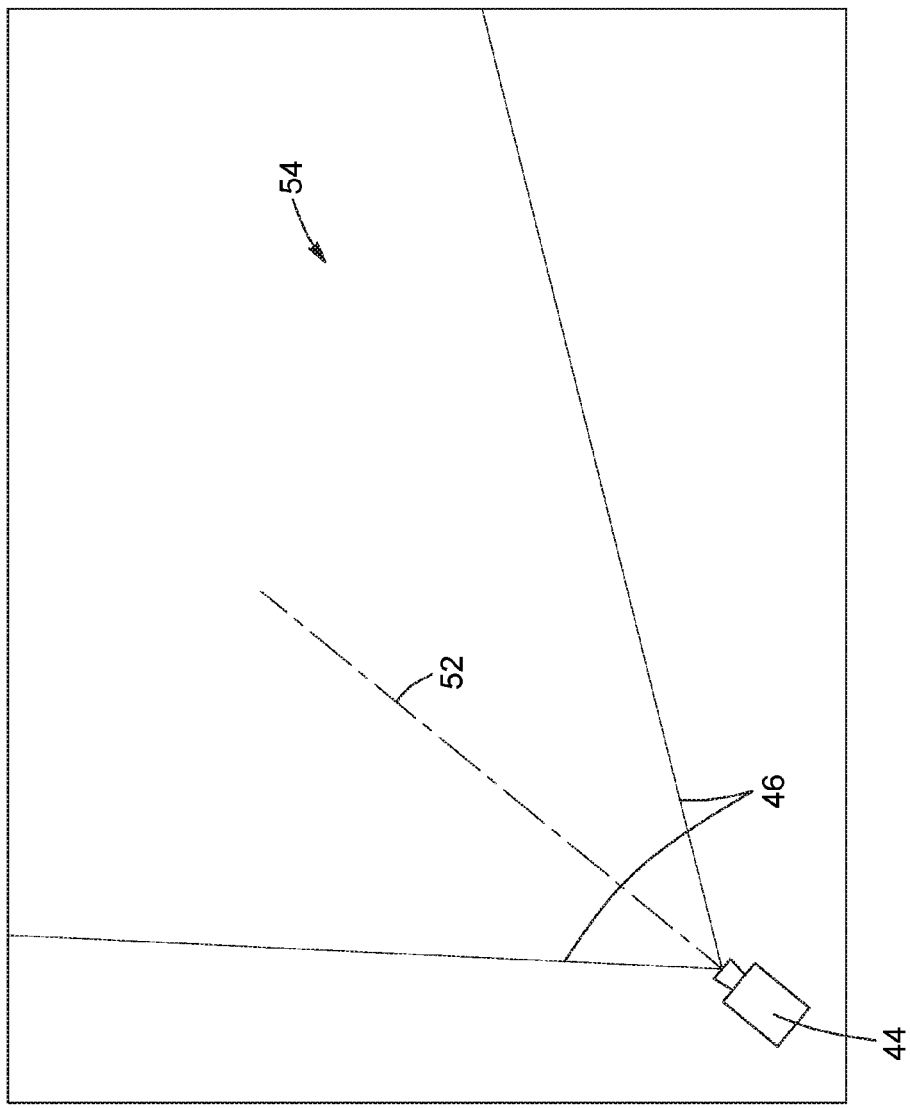
FIG. 7 is a top schematic view of a camera having a field of view covering a scene.
Figure 8:
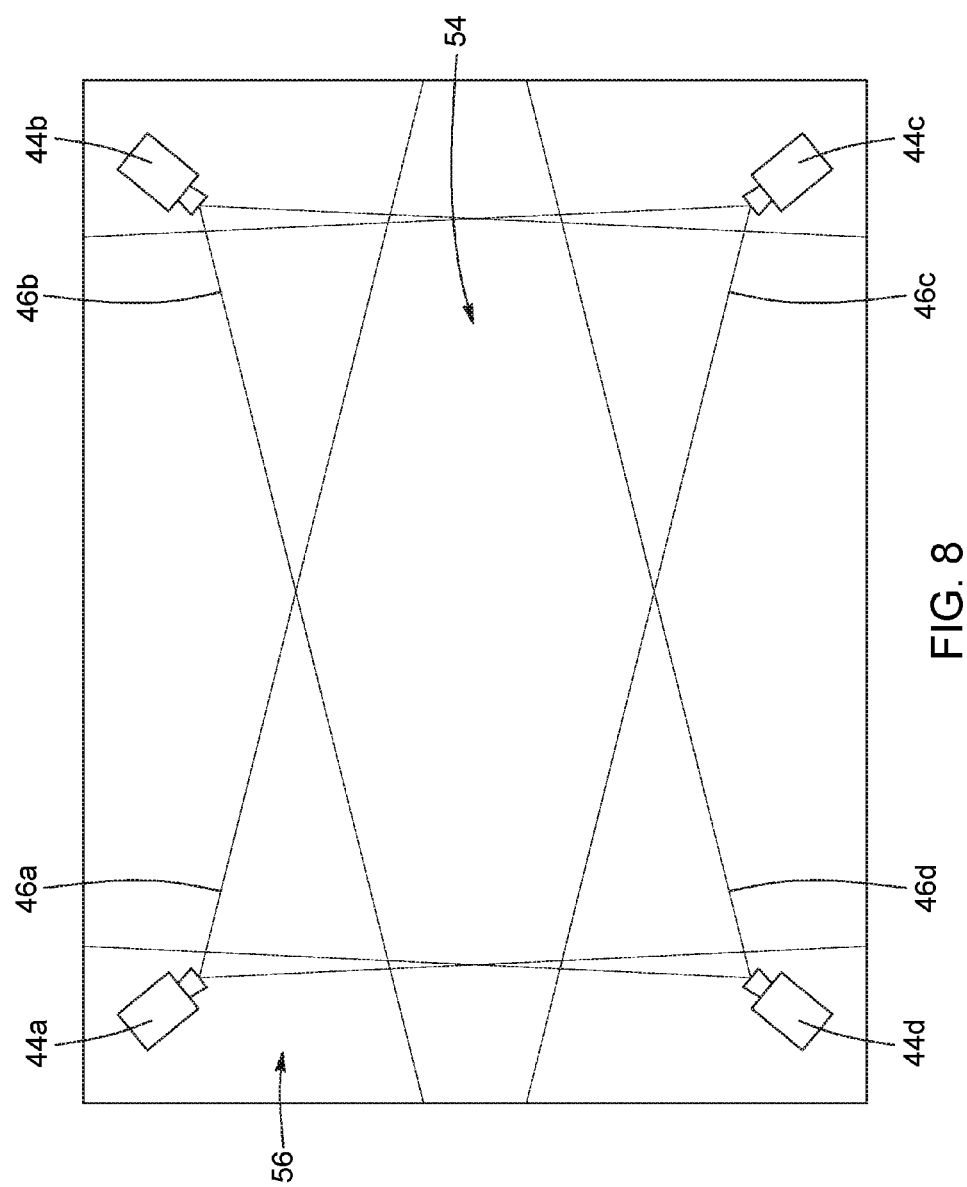
FIG. 8 is a top schematic view of a network of four cameras disposed around a scene. Each camera has a field of view that covers a portion of the scene and that partially overlaps the field of view of at least another camera of the network.
Figure 9A:
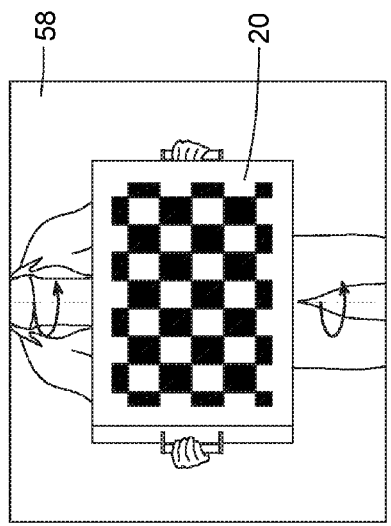
FIGS. 9A to 9D are schematic representations of four initial images of a calibration target at four different initial target poses. The initial images can be obtained during an initialization phase of a possible embodiment of a method of intrinsic calibration of a camera. The initial images can be used to obtain initial estimates of the intrinsic camera parameters.
Figure 9B:
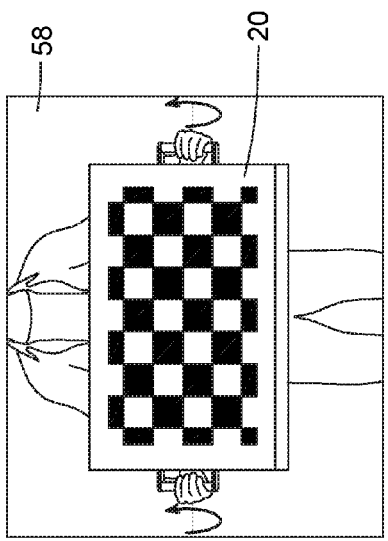
Figure 9C:
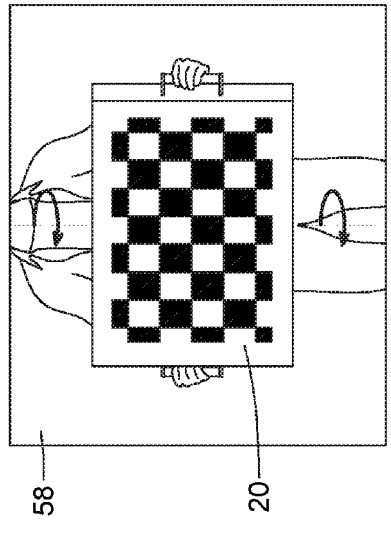
Figure 9D:
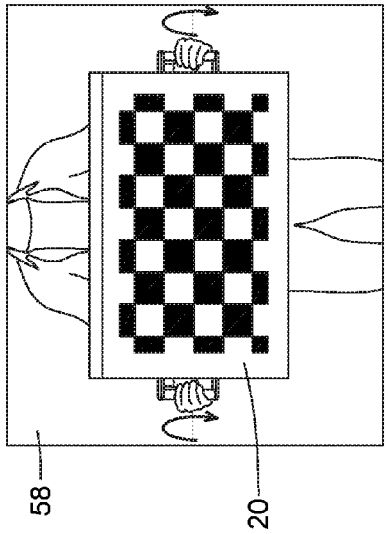

Referring to FIG. 6, there is provided a flow diagram of an embodiment of a method 200 for intrinsically calibrating a camera using a calibration target. In some implementations, the method 200 of FIG. 6 can be applied to a camera used in a single-camera configuration. An example of such a configuration is illustrated in FIG. 7, which depicts a single camera 44 having a field of view 46 covering a scene 54. Alternatively, in other implementations, the method of FIG. 6 can be applied to one, some or all of the cameras that form part of a camera network. An example of such a configuration is illustrated in FIG. 8, which depicts a network 56 of four cameras 44a to 44d disposed around a scene 54. Each camera 44a to 44d has a field of view 46a to 46d that covers a portion of the scene 54 and that partially overlaps the field of view 46a to 46d of at least another camera 44a to 44d of the network 56. It will be understood that the method 200 can be performed simultaneously for two or more cameras of the network using a single calibration target.

Broadly described, the method 200 of FIG. 6 includes a step 202 of providing a plurality of target images acquired with the camera, where each target image represents a view of the calibration target in a respective one of a plurality of target poses, each target pose corresponding to a given location and orientation of the calibration target relative to the camera. The method 200 also includes a step 204 of partitioning a volume of interest of the scene into a set of volume bins, and a step 206 of defining a set of angle bins, each angle bin encompassing a respective range of possible orientation values for the calibration target. The method 200 further includes a step 208 of identifying, among the plurality of target images, reference images of the calibration target, and a step 210 of assigning each reference image to one of the volume bins and/or one of the angle bins based on the respective target pose corresponding to the reference image. The method 200 also includes a step 212 of obtaining intrinsic camera parameters based on the reference images. More regarding these steps and other possible steps of the camera calibration method 200 will be described in greater detail below. It is noted that, in other embodiments, the order of execution of one or more of the steps described below and depicted in FIG. 6 may differ, and some of the steps may be combined or omitted.

In some implementations, the method 200 can include an initialization or preliminary step in which initial estimates for the intrinsic parameters of the camera to be calibrated are obtained. In some implementations, this preliminary step can include a step of acquiring a series of initial images of the calibration target at different initial target poses, and a step of obtaining initial estimates for the intrinsic camera parameters based on the series of initial images. This optional step, which can be referred to as a "bootstrap" phase, can provide initial, yet likely suboptimal, values for the sought intrinsic parameters, which are to be improved, optimized or corrected later in the process. In some implementations, the preliminary step can involve capturing initial images of the calibration target at different out-of-plane angles until the initialization is complete (see FIGS. 9A to 9D). In operation, information relating to the level of completion of the preliminary step can be displayed or otherwise made available to the user. In some implementations, performing such a bootstrap phase can help determining the bins (e.g., volume bins and angle bins) into which the qualified targets are to be assigned (see below).

Depending on the application, the preliminary step can be characterized by different parameters including, without limitation: the number of images required to complete the initialization procedure; the maximum out-of-plane rotation angle that is allowed to accept the target image as a suitable initial target image; the minimum change in out-of-plane rotation angle to accept a subsequent target image as a suitable target image; and the fraction of the image width and/or height to be occupied by the calibration target in order to accept a target image as a suitable target image. For example, it has been observed that, in some embodiments, only four initial target images may need to be acquired to complete the initialization and obtain suitable initial estimates for the intrinsic camera parameters. It is noted that such an initialization phase need not be performed in some implementations. For example, in some implementations, initial estimates for the intrinsic camera parameters can be obtained from a previous calibration run, from nominal values provided by the camera manufacturer, or from analytical or numerical calculations or models.

Figure 10:
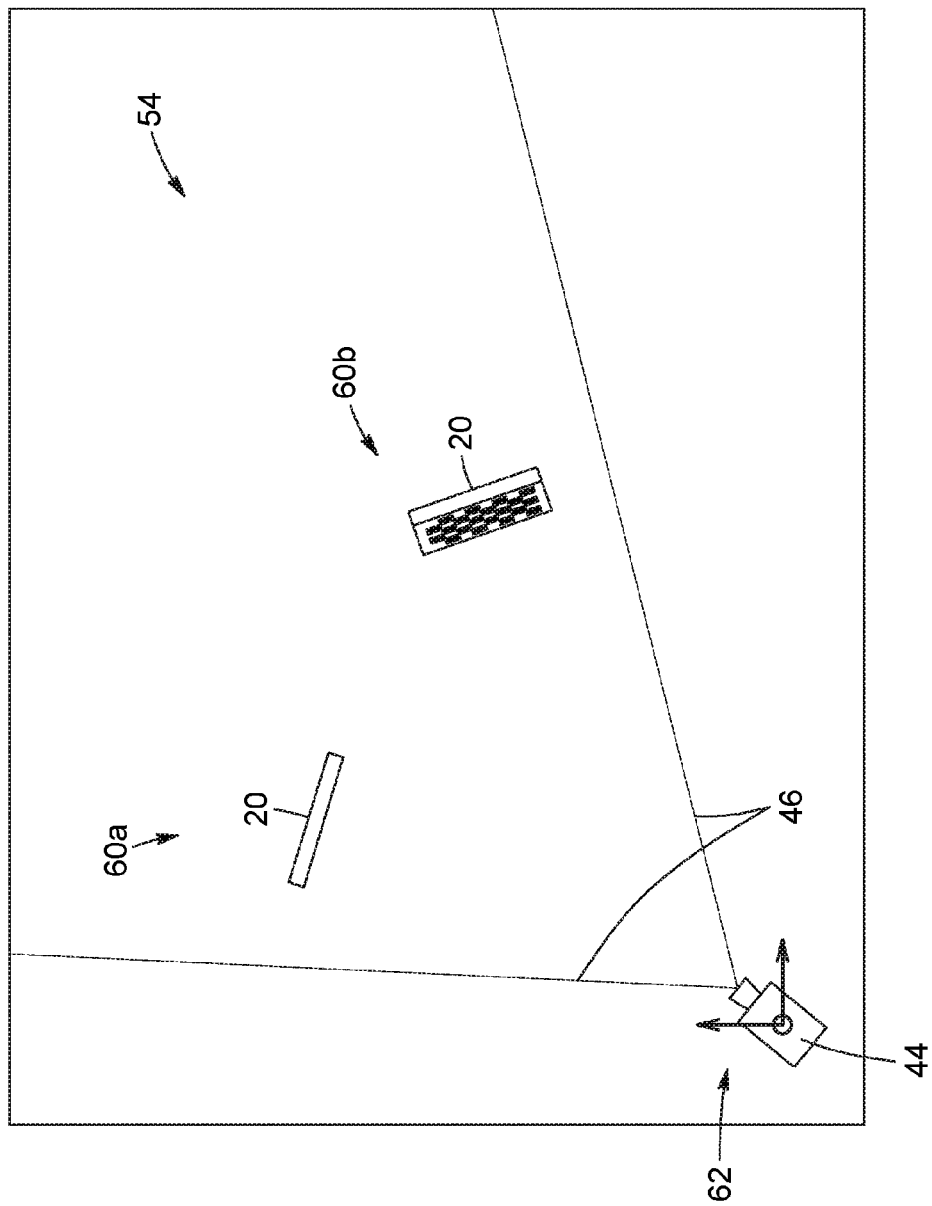
FIG. 10 is a schematic representation of two different target poses of a calibration target with respect to a camera to be calibrated. Each target pose corresponds to a given location and orientation of the calibration target relative to the reference frame of the camera.

In FIG. 6, the method includes the step 202 of providing a plurality of target images acquired with the camera, each target pose representing a view of the calibration target in one of a plurality of target poses. For example, referring to FIG. 10, there are illustrated two different target poses 60a, 60b of a calibration target 20 with respect to a camera 44, each of which corresponding to a given location and orientation of the calibration target 20 relative to the reference frame 62 of the camera 44 to be calibrated. Some of the images of the calibration target under different poses will provide reference images to be used in the calibration calculations. Depending on the application, the target images can be acquired as one or more video streams or a series of still images.

In the present description, the term "providing" is used broadly and refers to, but is not limited to, making available for use, acquiring, capturing, obtaining, accessing, supplying, receiving, and retrieving. For example, in some implementations, the providing step 202 can include a step of directly acquiring, with the camera, the plurality of target images of the calibration target in the respective plurality of target poses, and making available the target images thus acquired. In such implementation, the providing step 202 can also include a step of displacing the calibration target across the scene from one target pose to the next between the acquisition of successive ones of the plurality of target images. Alternatively, in other implementations, the step 202 of providing the plurality of target images can involve retrieving or receiving previously acquired target images, for example from a database or a storage medium. In all cases, the target images are or have been acquired with the camera to be calibrated.

Figure 1B:
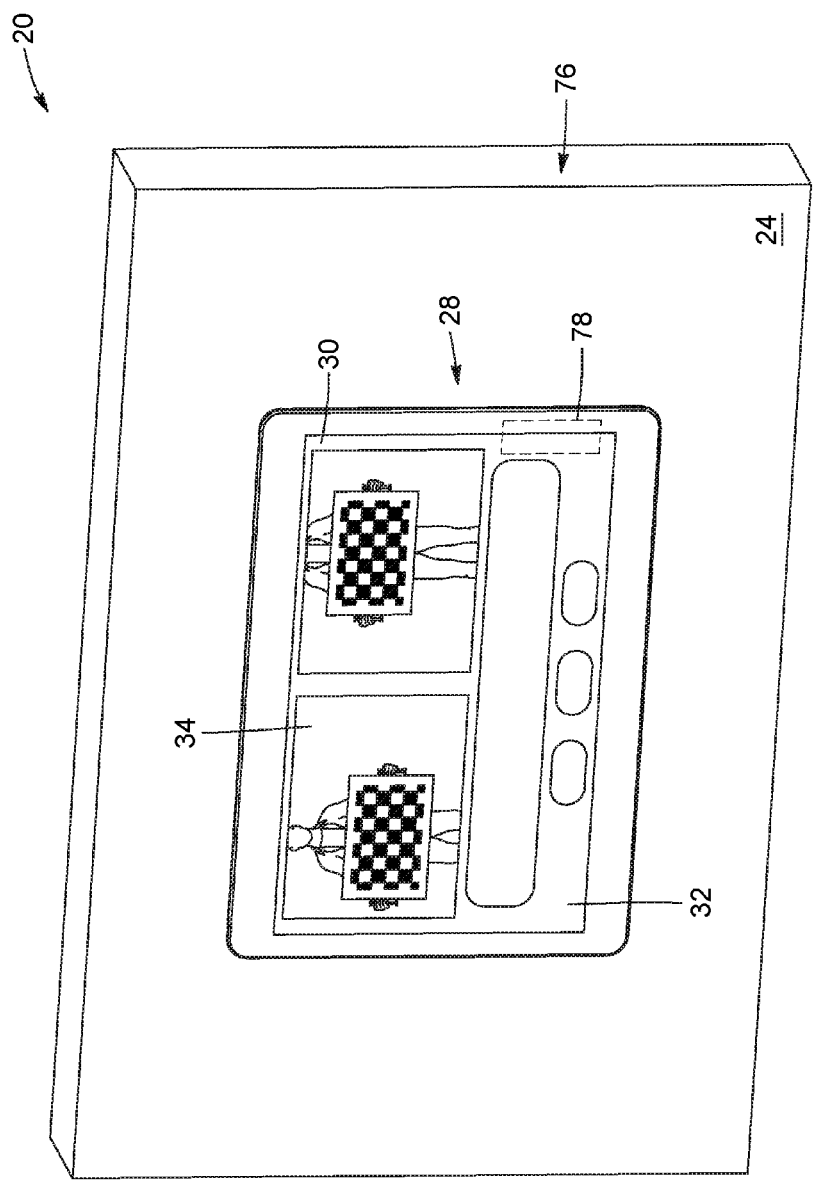
FIG. 1B is a schematic representation of the rear side of the planar calibration target of FIG. 1A.

In some implementations, the calibration target is portable and is intended to be held and moved within the scene by an operator such that the camera gradually captures images of the calibration target from varying distances and/or orientations relative to the camera. However, in other implementations, the movement of the calibration target within the scene during the image acquisition process can be accomplished by a robot operator or an automated machine. In some implementations, the calibration target 20 can be shaped as a thin rectangular plate with a front side 22 having a calibration pattern 26 thereon, as depicted in FIGS. 1A and 1B. For example, in some implementations, the calibration target can be a planar multi-waveband checkerboard assembly or rig designed to provide good contrast in the visible, NIR, SWIR and LWIR wavebands simultaneously. As shown in FIG. 3, the calibration target 20 can also include asymmetrical features 38 (e.g., orientation markers) which can be used to determine the orientation of the target 20 and to detect the target 20 in cases where it is only partly visible in an image. In some implementations, the calibration target can have a non-planar front side.

Returning to FIG. 6, the method 200 includes a step 204 of partitioning or dividing a volume of interest of the scene into a set of volume bins. In general, the volume of interest to be partitioned into volume bins corresponds to the viewing frustum of the camera or to a portion of the viewing frustum. In some implementations, the partitioning step 204 can include a sub-step of specifying the number of reference images to be assigned to each one of the volume bins. It is noted that, in some instances, the term "bin" can be used interchangeably with other terms such as "cell", "sector", "region", "section", and the like.

Figure 11:
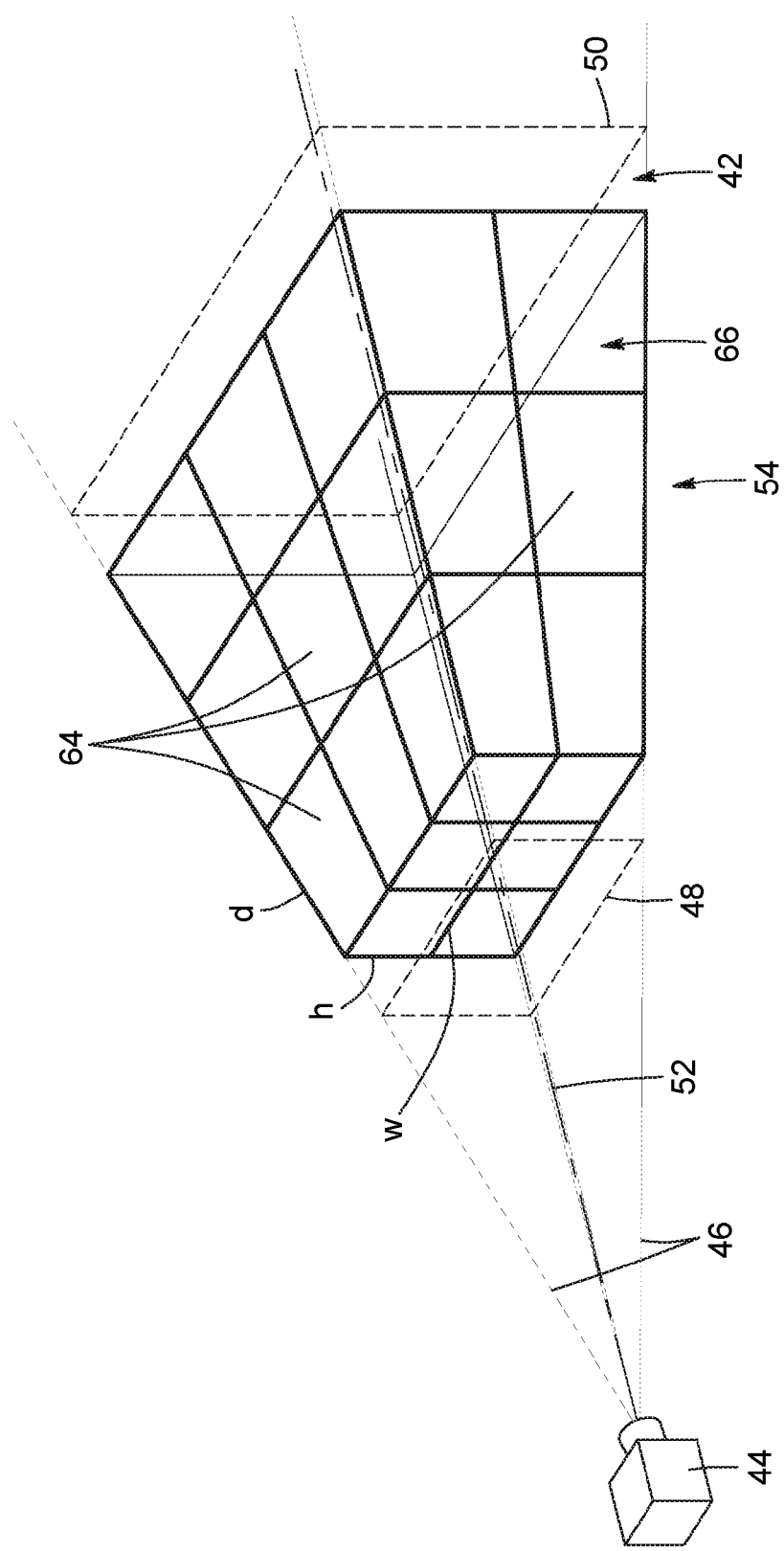
FIG. 11 is a schematic representation of the partitioning of a portion of the viewing frustum of a camera into a set of volume bins.

Referring to FIG. 11, there is provided an example of the partition of a portion of the viewing frustum 42 of a camera 44 into a set of volume bins 64. The partitioned portion of the viewing frustum defines the volume of interest 66 of the scene 54. Each volume bin 64 occupies a fraction of the volume of interest 66 and can be characterized by three spatial dimensions, namely a depth d, a width w, and a height h. The depth d is generally along the optical axis 52 of the camera 44, and the width and height lie in a plane normal to this axis. The width and height can vary as a function of depth. The volume bins are therefore based on both the position of the calibration target in the image and the depth of the target in the camera reference frame. In FIG. 11, the volume of interest is partitioned into 18 volume bins arranged as follows: 3 bins wide by 2 bins high by 3 bins deep. Of course, the number and arrangement of the volume bins can vary in other embodiments. As mentioned above, it can be advantageous in some implementations that the volume bins span the full field of view of the camera (i.e., in width and in height).

In some implementations, the volume bins can be characterized by several parameters including, without limitation, the number of volume bins (width×height) in which the images are divided into (e.g., 3 bins wide by 2 bins high in FIG. 11); the depth range in real-world units occupied by the volume bins; the number of volume bins along the depth range (e.g., 3 bins deep in FIG. 11); and the number of target images to be stored as reference images in each one of the volume bins for use in the calibration calculations. It is noted that the depth range also corresponds to the depth of the volume of interest in the field of view of the camera. In practice, the depth range can be limited by the range of distances within which the operator (human or nonhuman) can carry the target and the target can still be detected, otherwise some of the volume bins could always remain empty. Depending on the application or use, the size and/or shape of the different volume bins may or may not be all the same. Also, while it can be advantageous that all the volume bins be contiguous, this need not be the case in some implementations.

Returning to FIG. 6, the method 200 also includes a step 206 of defining a set of angle bins into which reference images of the calibration target are to be stored. Each angle bin encompasses a respective range of possible orientation values for the calibration target. For example, each angle bin can correspond to a predetermined range of out-of-plane rotation angles of the calibration target. The out-of-plane rotation angle of the calibration target can be defined as the angle formed by the optical axis 52 of the camera and the normal to the front side of the calibration target in a specific target pose. It is noted that when the calibration target is planar, the method can require or at least benefit from having a substantial proportion of the reference images captured as the calibration target is oriented out-of-plane. In some implementations, the defining step 206 can include a sub-step of specifying the number of reference images to be assigned to each one of the angle bins.

Figure 12A:
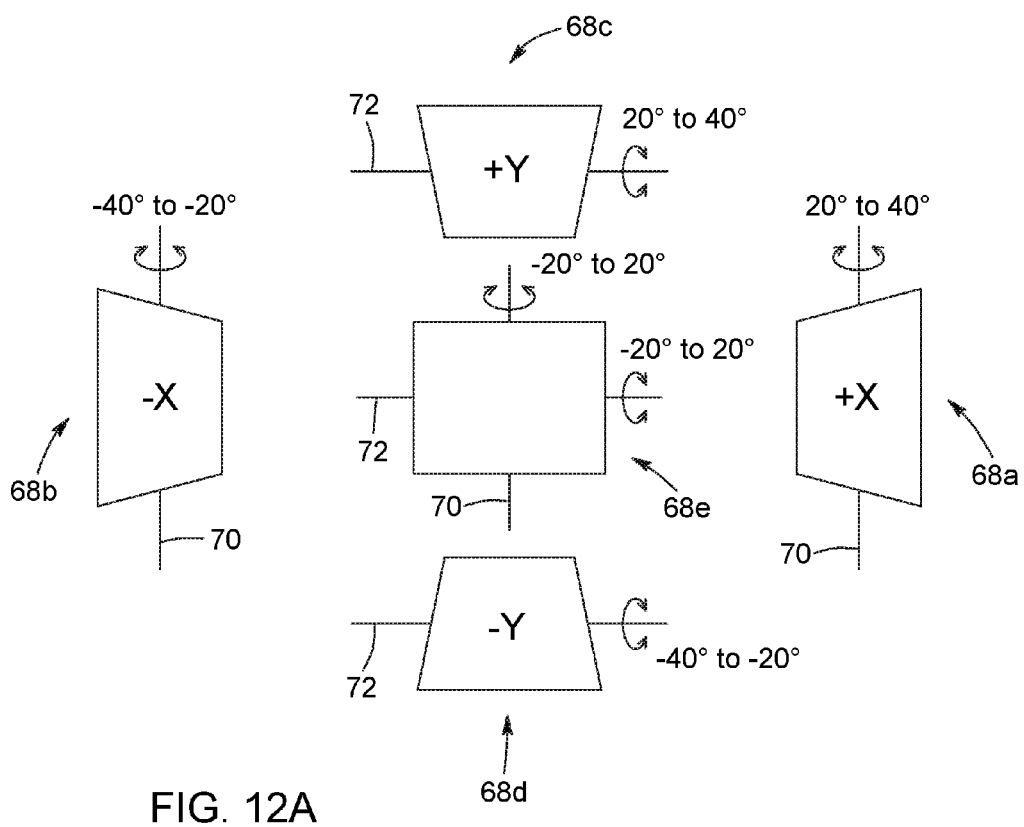
FIG. 12A is an exemplary schematic representation of a set of angle bins for storing reference images of a calibration target. In this example, the set includes five angle bins having the following angular distribution with respect to the camera horizontal and vertical axes: a first angle bin for storing positive X-angle target poses (e.g., 20° to 40°); a second angle bin for storing negative X-angle target poses (e.g., −40° to −20°); a third angle bin for storing positive Y-angle target poses (e.g., 20° to 40°); a fourth angle bin for storing negative Y-angle target poses (e.g., −40° to −20°); and a fifth angle bin for storing the target poses having negligible or small out-of-plane angles (e.g. −20° to 20°) along the both axes.
Figure 12B:
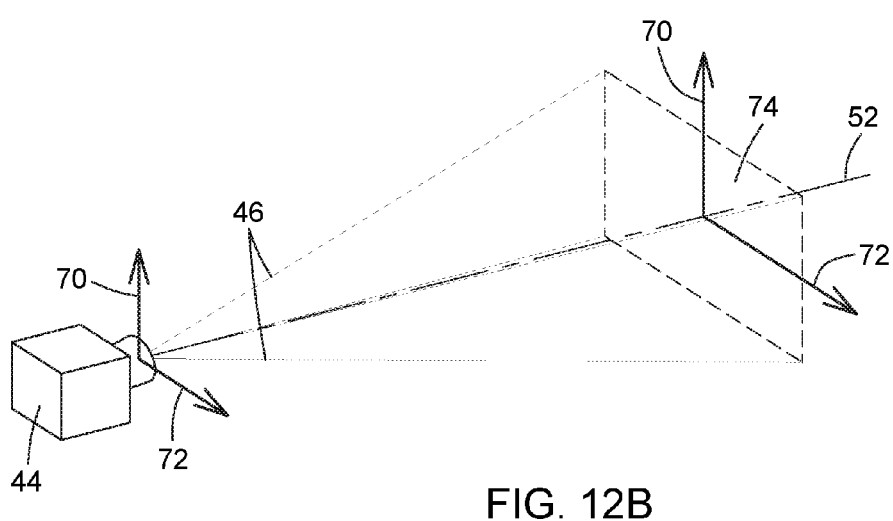
FIG. 12B illustrates the orientation of the horizontal and vertical axes with respect to the imaging axis of the camera and to a plane normal to the imaging axis.

In some implementations, the angle bins can be characterized by several parameters including, without limitation: the number of angle bins for positive or negative X-angles and Y-angles, excluding the bin storing poses without substantial out-of-plane plane angle (i.e., target poses where the calibration target is fronto-parallel or has only a small or negligible out-of-plane angle); the absolute value of the maximum strong out-of-plane rotation angle, according to which the angle bins can be defined; and the number of target images to be stored as reference images in each one of the angle bins for use in the calibration calculations. Referring to FIGS. 12A and 12B, the X-angle can refer to a rotation around the camera vertical axis 70, while the Y-angle refers to a rotation of the calibration target around the camera horizontal axis 72. The camera vertical and horizontal axes 70, 72 lie in a plane 74 normal to the imaging axis. For example, in FIG. 12A, the angle bin distribution includes five angle bins 68a to 68e: an angle bin 68a for positive X-angle poses (e.g., 20° to 40°), an angle bin 68b for negative X-angle poses (e.g., −40° to −20°), an angle bin 68c for positive Y-angle poses (e.g., 20° to 40°), an angle bin 68d for negative Y-angle poses (e.g., −40° to −20°), and an angle bin 68e for poses having a negligible or small out-of-plane angle (e.g. −20° to 20° along each axis). It is noted that the maximum strong out-of-plane rotation angle is equal to 40° in FIG. 12A. Depending on the application, the ranges of angles covered by the different angle bins may or may not be the same. Also, the number and angular coverage of angle bins associated with X-angle rotations may or may not be the same as the number and angular coverage of angle bins associated with Y-angle rotations. Likewise, the number and angular coverage of angle bins associated with positive X- or Y-angle rotations may or may not be the same as their counterparts associated with negative X- or Y-angle rotations.

Returning to FIG. 6, the method 200 also includes a step 208 of identifying, among the plurality of target images, reference images of the calibration target. Indeed, only a fraction of the target images acquired by the camera will generally be of satisfactory quality for use as reference images for obtaining the intrinsic camera parameters. As such, various processes and criteria, both objective and subjective, can be used to assess the quality of the target images.

In some implementations, the identifying step 208 can include a first sub-step of searching the calibration target in each target image, which can involve looking for one or more fiducial features present on the calibration target. As mentioned above, various feature extraction and image processing techniques can be used to detect and recognize fiducial features in captured target images. If the calibration target is found or recognized in a target image, the identifying step 208 can include a sub-step of evaluating at least one image quality parameter of the target image. In some implementations, the evaluating sub-step can include assessing at least one of a level of contrast, a level of saturation and a level of blur of the target image. In other implementations, an image quality metric for qualifying the target images can be a weighted sum or average of the following four quality factors; the number of points or fiducial markers detected on the target image; the level of blur in the image where the points or fiducial markers have been detected; the saturation of the image; and the contrast of the image. Finally, if each evaluated image quality parameter meets a respective specific or preset quality criterion or threshold, the identifying step 208 can include a sub-step of classifying the target image as one of the reference images.

In some implementations, it can be required or desirable that the calibration target remains steady and stable in the field of view of the camera during a certain time interval (e.g., about one second in some implementations) before being moved to the next pose to acquire the next target image. This can ensure or help ensure that a suitable set of images is selected, especially for multi-camera systems without accurate temporal synchronization of cameras. Also, images in which the target contains too much blur due to movement or incorrect focusing will generally be rejected at the outset.

In some implementations, the method can include a step of applying criteria used to select a subsequent target pose after the target has been detected. Such criteria can be applied to avoid selecting target poses that are not sufficiently different from one another. Non-limiting examples of such criteria can include: the value by which the out-of-plane rotation angle must have changed for a next pose to be considered different from a previous one; the value by which the target distance from the camera must have changed for a next pose to be considered different from a previous one; the fraction of a checkerboard square by which the target position must have changed for a next pose to be considered different from a previous one; and the number of consecutive stable images that must be acquired before a next target pose can be selected, which depends on the camera frame rate.

In some implementations, the rate at which the target images are processed (e.g., in frames per second) can be set. For example, the frame rate can be controlled to limit the processing speed if the user wants to visualize the detection outcomes for every frame. If set to a high frame rate (e.g., higher than 30 frames per second) the effective frame rate will generally be limited by the processing power of the computing platform. In some implementations, the number of frames to skip, if any, can also be set. For example, in some implementations, only a sample of the target images captured by the cameras can be analyzed for target detection, for example every other image.

Referring still to FIG. 6, the method 200 can further include a step 210 of assigning each reference image to either or both of one of the volume bins and one of the angle bins based on the respective target pose. The assigning step 210 then consists in populating the various volume bins and angle bins with the reference images. It is noted that depending on the application, each reference image identified during the identifying step 208 can be assigned to either a volume bin or an angle bin or to both a volume bin and an angle bin.

Depending on the application, the determination of the volume bin and/or angle bin to which each qualified target pose belongs can be made based on pixel-based information obtained from the target segmentation (i.e., 2D positioning) in the image; location and/or orientation information data obtained about the position of the calibration target relative to the camera under calibration (e.g., measured with position or motion sensors provided on the calibration target); or a combination thereof. For example, in some implementations, the appropriate volume bin is the one which contains more than 50% of the total number of fiducial points present on the calibration target. In some implementations, the determination of the depth coordinate of volume bins makes use of the target distance with respect to the camera. In some implementations, the determination of angle bins makes use of the target orientation with respect to the camera.

In some implementations, the providing step 202, identifying step 208 and assigning step 210 are performed at least partly concurrently with one another. In such implementations, the assignment of the reference images to their respective volume bin and/or angle bin can be performed gradually as the target images are acquired and the reference images are identified from the target images. In some implementations, the providing step 202, identifying step 208 and assigning step 210 can be performed until the current number of assigned reference images reaches a respective predetermined threshold amount for each one of the volume bins and each one of the angle bins.

In some implementations, a real-time mapping of the reference images to the appropriate volume bins and/or angle bins can be displayed, communicated or otherwise made available to the user. Such mapping can allow the user to monitor or track the populating of the volume and angle bins as it proceeds, thus providing a so-called "interactive" camera calibration method. For example, in some implementations, the method 200 can include a step of monitoring, in real-time, a current number of reference images stored in each one of the volume bins and each one of the angle bins. In such a case, the method 200 can include a step of communicating, to a user, filling-level information related to the current numbers of reference images assigned to the volume and angle bins. For example, the displacement of the calibration target from one target pose to the next between successive image captures can be performed based on the filling-level information.

In some implementations, real-time interaction and feedback are made possible by providing an "interactive" calibration target in communication with the processing unit that performs the assignment of the references to the respective bins. In some implementations, such an interactive calibration target can include a tablet computer (e.g., an iPad® or an Android® based tablet computer) or another electronic device mounted on the target itself. The tablet computer or electronic device can include an input and/or output interface, for example a touchscreen including a touch-sensitive surface for data input and a visual display for data output.

For example, returning to FIGS. 1A and 1B, an interactive calibration target 20 can include a substantially rectangular plate-shaped base 76 having a front side 22 and a rear side 24. On the front side 22 is provided a calibration pattern 26, for example a checkerboard pattern or a dot matrix, which is directed to the camera during the acquisition of the target images. On the rear side 24 is mounted, affixed or otherwise provided, a tablet computer 28 including a visual display 34. In such implementations, the communicating step can include a step of displaying filling-level information on the visual display of the tablet computer. As such, a user moving the calibration target within the scene to sequentially acquire target images can be continuously informed about the volume and angle bins that have been populated with enough reference images and about the volume and angle bins that remain to be filled with reference images. The user can therefore focus on populating those remaining volume and angle bins, thus improving the efficiency and execution time of the image acquisition and analysis process. For example, in some implementations, the percentage of completion of the bootstrap phase and the filling of the volume and the angle bins can be displayed on the tablet computer for an individual camera. Furthermore, in application where multiple cameras are intrinsically calibrated at the same time using the same calibration target, the user interface of the tablet computer can allow the user to switch between different cameras and/or to monitor individual volume or angle bins for any of the available cameras.

Returning to FIG. 6, in some implementations, the method 200 can further include, during the providing step 202, a sub-step of measuring at least one of location information and orientation information about the calibration target with at least one sensor mounted on the calibration target. In such implementations, the assigning step 210 can include a sub-step of determining the location and/or orientation of the calibration target corresponding to each reference image based on the location information and/or orientation information measured by the at least one sensor. For example, referring to FIG. 1B, the tablet computer 28 affixed to the rear side 24 of the calibration target 20 can include position, distance and/or orientation sensors 78, such as accelerometers, gyroscopes and other types of motion sensors. Such sensors 78 can provide positional data about the calibration target 20, which in turn can be used in the calibration process to provide a complementary way of assessing the location and/or orientation of the calibration target in the different target poses.

Returning to FIG. 6, the method 200 can include a step 212 of obtaining the intrinsic camera parameters based on the reference images assigned to the volume bins and to the angle bins. In some implementations, the obtaining step 212 can be performed iteratively and at least partly concurrently with the providing step 202, identifying step 208 and assigning step 210. That is, the computations required to obtain the intrinsic camera parameters can begin as soon as a certain number of reference images have been identified from the acquired target images and assigned to their respective bins. Alternatively, in other implementations, the obtaining step 212 can be performed after completion of the providing step 202, identifying step 208 and assigning step 210, that is, only after all the reference images have been acquired, identified and assigned to the bins.

Given the many computational approaches and toolboxes available for performing camera calibration, it will be appreciated by those skilled in the art that various computer-implemented and software-based analytical and/or numerical techniques can be employed for estimating the intrinsic parameters of each camera from the set of reference images. For example, the present techniques can be implemented with various calibration mathematical models and various types of calibration targets provided that the process has access to the appropriate software routines and calibration targets. It is also noted that the configuration and arrangement of the volume and angle bins (e.g., in terms of size, shape, content, number, etc.) can be adjusted in accordance with the camera calibration technique or model employed in a specific implementation.

For example, in the case of a planar calibration target, each reference image can provide a correspondence or mapping, known as a homography, between 3D points in object space and their 2D projection on the reference image. As mentioned above, such a correspondence can be determined by using fiducial-based image processing techniques that can identify known fiducial markers, indicia or features (e.g., the inner corners 36 of a checkerboard pattern 26; see FIG. 2). Each correspondence can provide a set of linear equations in which the unknowns are related to the intrinsic camera parameters to be estimated. To solve for all the unknowns, there is generally a minimal number of correspondences (i.e., reference images) that should be considered. In practice, significantly more than the minimal number of correspondences are often used to gain higher accuracy, resulting in an over-determined system of linear equations. The system of linear equations can be solved using singular value decomposition or other appropriate methods to yield the unknowns, from which the intrinsic camera parameters can be determined. In some implementations, the intrinsic camera parameters can be further refined by using a non-linear least-squares method in which the objective function to be minimized is the reprojection error of the target pose fiducials.

Referring still to FIG. 6, in some implementations, the method 200 can allow the progress of the intrinsic camera calibration to be monitored by the user. In some implementations, the obtaining step 212 can include a sub-step of determining a calibration error associated with the obtained intrinsic camera parameters. One possible approach to assess the completion level of the intrinsic calibration is to continuously or repeatedly (e.g., periodically) compute the average reprojection error of target points in the reference images and then compare the computed error with a predetermined threshold below which the intrinsic calibration is considered complete or satisfactory. In such implementations, the obtaining step 212 can be performed iteratively until the calibration error gets lower than a predetermined error value, at which point the providing step 202, identifying step 208 and assigning step 210 can also be stopped.

In some implementations, as mentioned above, the method 200 can also or instead allow the user to monitor the current number of reference images used in the calculations. Monitoring this information can be useful when the obtaining step 212 is performed concurrently with the providing step 202, identifying step 208 and assigning step 210 since, in this case, the reference images are progressively added into the intrinsic calibration calculations. As such, the intrinsic calibration calculations are performed iteratively and refined with each successive addition of a new reference image. For example, in scenarios where the method 200 is performed to obtain the intrinsic parameters of more than one camera at the same time using a single calibration target, the method 200 can allow the user to track over time the cameras that have been intrinsically calibrated and the ones that have not been or that are currently being intrinsically calibrated. In some implementations, all this information about the calibration process can be displayed in real-time to the user via the display of a tablet computer affixed to the calibration target held by the user.

Calibration Method for Obtaining Extrinsic Camera Parameters in a Camera Network The present techniques can also allow the calibration of the extrinsic parameters of a multi-camera system to establish the external parameters describing the network of cameras by establishing the pose of each camera with respect to a real-world scene. The extrinsic calibration of a multi-camera system can allow the determination of both the position and orientation of each camera with respect to a reference coordinate system and the relative position and relative orientation of all the cameras with respect to one another. The reference coordinate system can be any appropriate real-world feature. In some implementations, the reference coordinate system is the coordinate system of one of the cameras, which is referred to as the "reference camera". Depending on the application, the extrinsic calibration can be performed prior to, concurrently with, or after the intrinsic calibration. In this context, the intrinsic calibration can be performed using the method disclosed herein or another method.

Figure 13:
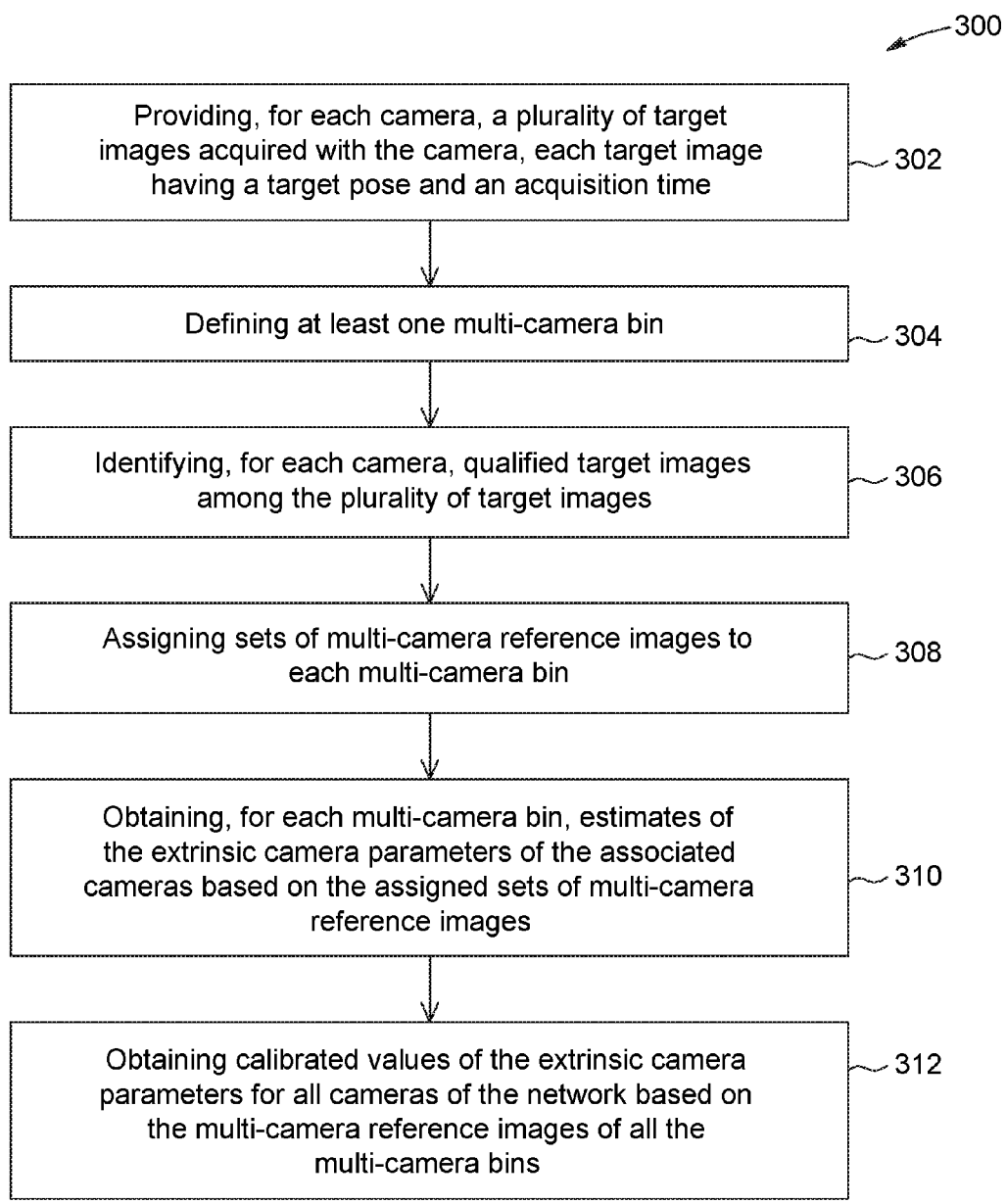
FIG. 13 is a flow diagram of a method of extrinsic calibration of a network of cameras using a calibration target, in accordance with an embodiment.

Referring to FIG. 13, there is provided a flow diagram of an embodiment of a method 300 for extrinsically calibrating a network of cameras using a calibration target. Each camera of the network has a field of view that covers a portion of a scene and that partially overlaps the field of view of at least another camera of the network.

In FIG. 8, an example of a multi-camera network 56 including four time-synchronized cameras 44a to 44d rigidly mounted and disposed around an observable scene 54 is depicted. Each camera 44a to 44d has a field of view 46a to 46d encompassing a portion of the scene 54 and overlapping partially the field of view 46a to 46d of at least one of the three other cameras 44a to 44d. Each camera 44a to 44d can provide still images or a video stream of the scene 54 within. Non-limiting examples of multi-camera networks to which the present techniques can be applied include stereo camera rigs, surveillance camera networks, multi-waveband camera setups, virtual reality caves, virtualization rooms, and the like. It will be understood that the present techniques are not a priori limited in terms of the number of cameras that can be simultaneously calibrated, provided that the field of view of each camera at least partly overlaps the field of view of at least another camera of the network. For example, in some implementations, the network can include between two and fifty cameras. In practice, the number of cameras is bounded by the capabilities (e.g., amount of memory, processing power, etc.) of the computing platform on which the calibration process is implemented.

Returning to FIG. 13, the method 300 can include a step 302 of providing, for each camera, a plurality of target images acquired with the camera. For each camera, each target image represents a view of the calibration target captured in a respective target pose and at a respective acquisition time. Some of the images of the calibration target acquired by the cameras will provide reference images to be used in the calibration calculations. In some implementations, the providing step 302 can include a step of directly acquiring, with each camera, the plurality of target images of the calibration target in the respective plurality of target poses, and making available the target images thus acquired. In such implementation, the providing step 302 can also include a step of moving the calibration target across the scene while target poses thereof are progressively acquired by the plurality of cameras. Depending on the application, the calibration target can be moved by a human or a nonhuman user (e.g., a robot). It will be understood that at any moment during the image acquisition process, the calibration target can be in the field of view of none, one, some or all of the cameras. Alternatively, in other implementations, the providing step 302 can involve retrieving or receiving previously acquired target images, for example from a database or a storage medium. In all cases, all the target images are or have been acquired with the cameras to be calibrated.

Referring still to FIG. 13, the method 300 includes a step 304 of defining at least one multi-camera bin. Each multi-camera bin is associated with a specific combination of two or more cameras having partially overlapping fields of view. For example, in some implementations, each multi-camera bin is a two-camera bin associated with two of the cameras of the network. This is the case for the network 56 shown in FIG. 8, where six camera pairs and six associated two-camera bins can be defined from the four cameras 44a to 44d (e.g. first and second cameras 44a, 44b, first and third cameras 44a, 44c, first and fourth cameras 44a, 44d, second and third cameras 44b, 44c, second and fourth cameras 44b, 44d, and third and fourth cameras 44c, 44d). As described below, in some implementations, the qualified target images stored in each multi-camera bin can be used to either obtain the extrinsic camera parameters or validate the obtained extrinsic camera parameters.

In some implementations, the multi-camera bins can be characterized by several parameters including, without limitation: the number of qualified target images to be stored as (multi-camera) reference images in each multi-camera bin; and the number of qualified target images to be stored as (multi-camera) validation images in each multi-camera bin. In some implementations, as the bins are being filled up, the process can alternate between the calibration bins and the validation bins while maintaining constant the ratio of the number of images to be stored as reference images to the number of images to be stored as validation images. In some implementations, a qualified target image is stored in a corresponding multi-camera bin irrespectively of the location of the calibration target within the overlap zone defined by the partially overlapping fields of view of the cameras associated with the multi-camera bin. However, in other implementations, it may be envisioned to partition each multi-camera bin into sub-bins associated with different regions of the overlap zone.

Returning to FIG. 13, the method 300 can include a step 306 of identifying, for each camera, qualified target images among the plurality of target images. Indeed, as mentioned above regarding the intrinsic calibration method, only a fraction of the target images will typically be of satisfactory quality for use in calibration calculations. As also mentioned above, various processes and criteria, both objective and subjective, can be used to assess the quality of the target images.

In some implementations, the identifying step 306 can include a step of searching the calibration target in each target image acquired by each camera, which can involve looking for one or more fiducial features present on the calibration target. If the calibration target is found, the identifying step 306 can include a step of evaluating at least one image quality parameter of the target image, which can include assessing at least one of a level of contrast, a level of saturation and a level of blur of the target image. As mentioned above regarding the intrinsic calibration method, an exemplary image quality metric for qualifying the target images can be a weighted sum or average of the following quality factors: the number of points or fiducial markers detected on the target image; the level of blur in the image where the points or fiducial markers have been detected; the saturation of the image; and the contrast of the image. If each evaluated image quality parameter meets a respective specific or preset quality criterion or threshold, the identifying step 306 can include a step of classifying the target image as a qualified target image.

It will be understood that in embodiments where the method 300 of FIG. 13 is performed concurrently with the method 200 of FIG. 6, each qualified target image can be assigned to a volume bin, and/or an angle bin and/or a multi-camera bin, and therefore be used to compute either or both of intrinsic and extrinsic camera parameters.

In FIG. 13, the method 300 can further include, for each multi-camera bin, a step 308 of assigning sets of multi-camera reference images to the multi-camera bin to populate the multi-camera bin. The multi-camera reference images in each set have the same acquisition time and consist of one of the qualified target images acquired by each one of the cameras associated with the multi-camera bin. In other words, the multi-camera reference images are qualified target images acquired simultaneously by all the cameras associated with a multi-camera bin. It will be noted that, in general, a qualified target image acquired by one of the cameras can be assigned to none, one or more than one of the multi-camera bins. Depending on the application, the determination of the multi-camera bin to which temporally and spatially matched qualified target images belong can be based on pixel-based information obtained from the target segmentation in the associated qualified target images; location and/or orientation information data obtained about the position of the calibration target relative to the cameras under calibration (e.g., measured with position or motion sensors provided on the calibration target); or a combination thereof.

In some implementations, the providing step 302, identifying step 306 and assigning step 308 can be performed at least partly concurrently with one another. In such implementations, the assignment of the sets of multi-camera reference images to the multi-camera bins can be performed concurrently with the step of acquiring and qualifying the target images. In some implementations, the providing step 302, identifying step 306 and assigning step 308 can be performed until the current number of assigned sets of reference images reaches a respective predetermined threshold amount for each one of the multi-camera bins.

In some implementations, a real-time mapping of the qualified target images to the appropriate multi-camera bin can be displayed, communicated or otherwise made available to the user. Such mapping can allow the user to monitor or track the populating of the multi-camera bins as it proceeds. For example, in some implementations, the method 300 can include a step of monitoring, in real-time, a current number of sets of multi-camera reference images assigned to each multi-camera bin. In such a case, the method 300 can include a step of communicating, to a user, filling-level information related to the current number of sets of multi-camera reference images assigned to each multi-camera bin. For example, the displacement of the calibration target within the scene during the image acquisition step can be performed based on the filling-level information.

As mentioned above, in some implementations, real-time interaction and feedback are made possible by providing an interactive calibration target. As also mentioned above, such an interactive calibration target can include a tablet computer or another electronic device mounted on the calibration target itself. In such implementations, the communicating step can include a step of outputting information about the filling level of each multi-camera bin via the tablet computer (e.g., visually or audibly through a visual display or a speaker). As such, a user moving the calibration target within the scene to sequentially acquire target images can be continuously informed about the multi-camera bins that have been populated with enough sets of multi-camera reference images and about the multi-camera bins that remain to be filled with multi-camera reference images. The user can therefore focus on populating those remaining multi-camera bins, thus improving the efficiency and execution time of the image acquisition and analysis process. In some implementations, the percentage of completion of the filling of the multi-camera bins can be displayed on the tablet computer. Depending on the application, the user interface of the tablet computer can allow the user to switch between different cameras and/or to monitor individual multi-camera bins for any of the pairs or groups of cameras.

In FIG. 13, in some implementations, the method 300 can further include, during the providing step 302, a step of measuring at least one of location information and orientation information about the calibration target with at least one sensor mounted on the calibration target. In such implementations, the assigning step 308 can include, for each multi-camera bin, a step of assigning the sets of multi-camera reference images to the multi-camera bin based on the location information and/or orientation information measured by the at least one sensor. In some implementations, a dynamic selection of the camera video stream or streams to be displayed by the electronic device mounted on the calibration target can be performed based on target segmentation in the captured images and/or positional information measured by sensors provided with the electronic device. This feature can allow automatically and dynamically selecting, among the video streams from all the cameras to be calibrated, the pair or group of video streams that is deemed the most relevant to the user manipulating the calibration target in view of the multi-camera bins left to be filled and/or the position of the target within the scene.

The calculation of the extrinsic camera parameters is based on the multi-camera reference images stored in the multi-camera bins. Depending on the application, the calculations required to obtain the extrinsic camera parameters can begin as soon as a certain number of multi-camera reference images have been assigned to the respective multi-camera bins (i.e., concurrently with the image acquisition and analysis process). Alternatively, in other implementations, the calculations required to obtain the extrinsic camera parameters can be performed once all the reference images have been assigned to the bins (i.e., subsequently to the image acquisition and analysis process).

Given the many computational approaches and toolboxes available for performing camera calibration, it will be appreciated by those skilled in the art that various computer-implemented and software-based analytical and/or numerical techniques can be employed for extrinsically calibrating a multi-camera system from the set of reference images. More particularly, the present techniques can be implemented with various calibration mathematical models and various types of calibration targets provided that the process has access to the appropriate software routines and calibration targets. It is also noted that the configuration and arrangement of the multi-camera bins (e.g., in terms of size, shape, content, number, etc.) can be adjusted in accordance with the camera calibration technique or model employed in a specific implementation.

Referring still to FIG. 13, the method 300 can involve, for each multi-camera bin, a step 310 of obtaining, based on the multi-camera reference images stored in the multi-camera bin, estimated values for the extrinsic parameters of each camera associated with the multi-camera bin. The estimated values of the extrinsic parameters of the cameras associated with a certain multi-camera bin are given with respect to a reference frame associated with this multi-camera bin. This reference frame can be, for example, the reference frame of one of the cameras associated with the bin or another world reference frame.

The method 300 can also include a step 312 of obtaining, based on the estimated values of the extrinsic parameters of all the cameras of the network, calibrated values of the extrinsic parameters for each camera of the network in a same global reference frame. The global reference frame can be the reference frame of one of the cameras of the network or another common world reference frame. It is to be noted that in a scenario where only one multi-camera bin is defined, for example when the network of cameras includes only a pair of cameras, the estimated values of the extrinsic camera parameters are used as the calibrated values.

For example, in some implementations, performing the extrinsic calibration of a multi-camera system can be performed in accordance with a three-step process, including (a) extrinsic calibration of the cameras in a bin-by-bin manner to obtain estimated values for the extrinsic parameters of each camera; (b) extraction of the minimum set of transformations needed to represent the camera network based on the extrinsic parameters obtained, bin-by-bin, from the different multi-camera bins; and (c) global extrinsic calibration of all the cameras to obtain calibrated values of the extrinsic parameters for each camera. Depending on the physical configuration of the camera network, several transformations may have to be made to go from the reference frame of any one of the cameras of the network to the reference frame of the reference camera. The minimum set of transformations gives, for each of the cameras, the shorter path, that is, the minimum number of reference frame changes, and yields the transformation passing through this shortest path. In some implementations where the world reference frame corresponds to the reference frame of the reference camera, the minimum set of transformations to represent the camera network can be defined as the poses of all the elements of the system with respect to the reference camera, that is, the pose of every camera and every unique target pose with respect to the reference camera. The minimum set of transformations can include the following reference frame transformations: N transformations giving the pose of each one of the N cameras of the network with respect to the reference camera; M transformations giving the pose of each one of the M unique target poses with respect to the reference camera. In some implementations, the global calibration of all the cameras can involve the refinement of the extrinsic parameters of all cameras through an optimization method such as non-linear least-squares analysis that seeks to minimize the reprojection error of the target pose fiducials.

In some implementations, the method 300 of FIG. 13 can allow the user to monitor the progress of the extrinsic camera calibration. One possible approach to assess the completion level of the extrinsic calibration is to continuously or repeatedly (e.g., periodically) compute the average reprojection error of target points in the reference images and then compare the computed error with a predetermined threshold below which extrinsic calibration is considered complete or satisfactory. In such implementations, the obtaining steps 310 and 312 can be performed iteratively until the calibration error gets lower than a predetermined error value, at which point the providing step 302, identifying step 306 and assigning step 308 can also be stopped.

In some implementations, the method 300 can also or instead allow the user to monitor the current number of sets of reference images assigned to each multi-camera bin. Monitoring this information can be useful when the obtaining steps 310 and 312 are performed concurrently with the providing step 302, identifying step 306 and assigning step 308, the multi-reference images are progressively added into the extrinsic calibration calculations. As such, the extrinsic calibration calculations are performed iteratively and refined with each successive addition of a new set of reference images. The process can also allow the user to track which cameras have been extrinsically calibrated and which ones have not been or are currently being extrinsically calibrated.

In some implementations, all this information about the calibration process can be displayed in real-time to the user via the display of a tablet computer affixed to the calibration target held by the user.

Validation of Calibration Results

Once the intrinsic and/or extrinsic camera parameters have been obtained, the present techniques can provide a step of validation of the calibration results. Depending on the application or use, different criteria or measures can be used to ascertain the validity or quality of the camera calibration. Non-limiting examples of such criteria or measures can include the reprojection error and the rectification error for the intrinsic parameters; and the reconstruction error and the alignment or registration error for the overall intrinsic and extrinsic calibration.

Figure 14A:
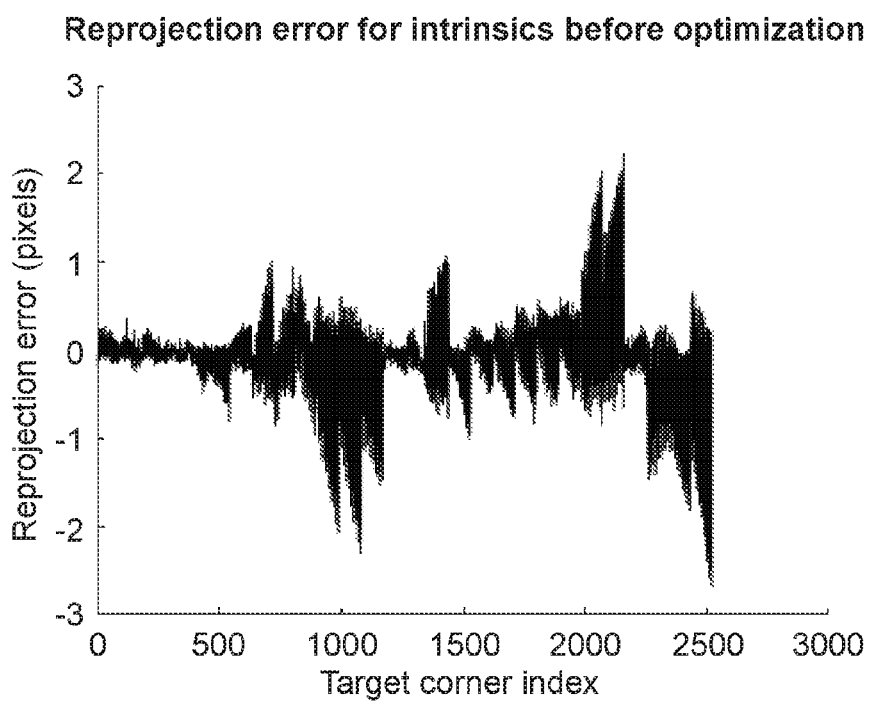
FIGS. 14A to 14D show graphs of the reprojection error for intrinsic (FIGS. 14A and 14B) and extrinsic (FIGS. 14C and 14D) camera parameters of a camera network computed for every checkerboard corner in every reference image, in accordance with an embodiment. Each pair of graphs provides a comparison of the reprojection error computed before optimization (FIGS. 14A and 14C) and after optimization (FIGS. 14B and 14D).
Figure 14B:
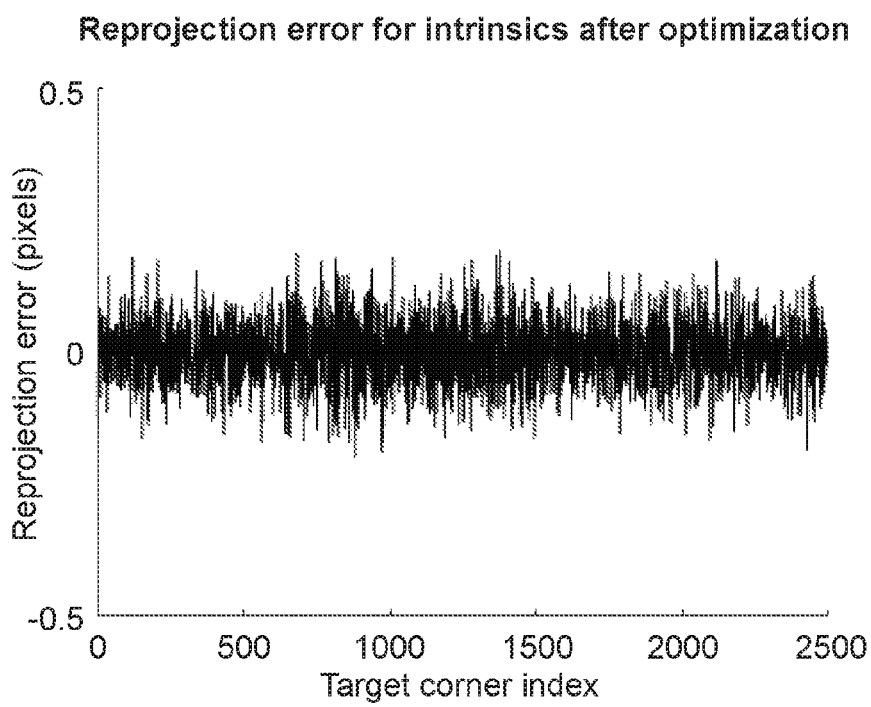
Figure 14C:
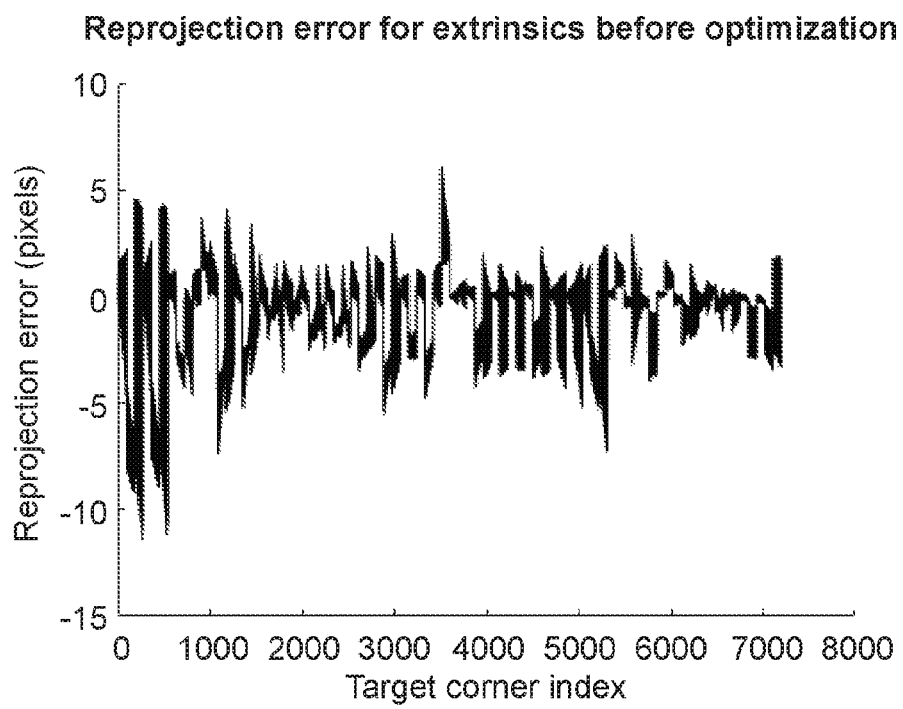
Figure 14D:
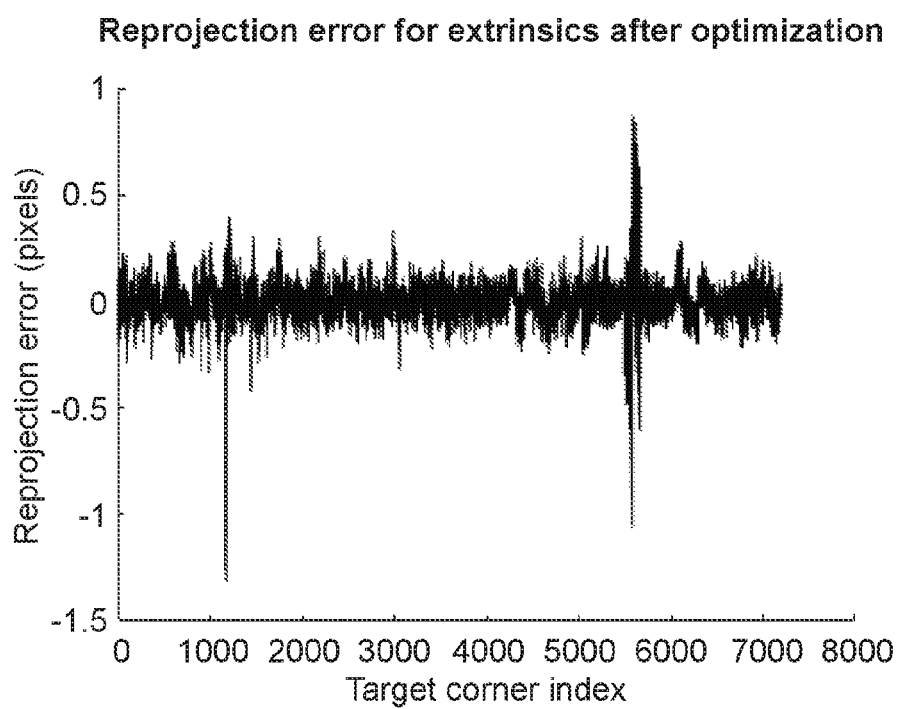

In some implementations, when the camera calibration is completed, the reprojection error for every checkerboard corner in every qualified target pose (i.e., reference image) can be computed and presented to the user. For example, referring to FIGS. 14A to 14D, graphs can be computed for the intrinsic parameters of each camera of a network (FIGS. 14A and 14B) and for the extrinsic parameters of all the cameras of the network (FIGS. 14C and 14D). The graphs show the error vector before optimization (FIGS. 14A and 14C) and after optimization (FIGS. 14B and 14D). Additional information that can optionally be presented to the user is the position and orientation of each camera in 3D space.

In some implementations, the calibration can be validated using sets of qualified target poses stored as validation images in the different multi-camera bins. Returning to FIG. 13, in some implementations, the method 300 can include, a step of assigning, for each multi-camera bin, sets of validation images to the multi-camera bin, the validation images in each set having a same acquisition time and consisting of one of the qualified target images acquired by each one of the two or more associated cameras. The validation images correspond to different qualified target than those forming the reference images to ensure or help ensure the accuracy, reliability and independence of the validation process.

In some implementations, two different validation techniques can be used: 3D reconstruction and image registration. Either of or both the validation techniques can be run automatically at the end of the calibration process, but as described below, one method might be better suited than the other depending on the application and/or the relative configuration and arrangement of the cameras.

In some implementations, the validation method based on 3D reconstruction involves reconstructing the inner corners of a checkerboard calibration target using stereo information or techniques, and then reprojecting the resulting 3D points into the validation images. The root-mean-square (RMS) value of the reprojection error can be computed for each image. In some implementations, the validation method based on image registration consists in projecting the image of one camera into the image of another camera. This validation method is particularly useful when cameras are placed side-by-side, which is typical for image fusion applications. In some implementations, a target distance must be specified. For example, the default target distance can be the average z-coordinate (depth) of the reconstructed checkerboard corners. A histogram clipping ratio can be used to specify the fraction of the image to saturate at low and high pixel values. This may be useful to enhance low contrast images.

In some implementations, when image registration tests are finished, the results of the calibration process can be presented to the user. The information can include the intrinsic and extrinsic calibration parameters for each camera and the validation results for each validation pose associated with each pair of cameras.

In some implementations, the validation results can be used to compute and output one or more of the following types of errors.

Relative 3D distance error RMS: For this error, the ground truth of the absolute position of the target in space is not known but the actual size of the calibration target is. The distance in 3D between the reconstructed checkerboard corners is computed. The same is done for the distance between the nominal 3D coordinates of the corners, which defines the ground truth. The two sets of distances are compared and the RMS value is taken. This error is in real units.

Alignment error RMS: For this error, the homolog points of the checkerboard corners are registered in image space. The registered positions are compared with the positions given by the original corner detection and the RMS value is taken. This error is in pixels.

Reprojection error RMS: For this error, the reconstructed checkerboard corners are reprojected in the camera validation image. These are compared with the positions given by the original corner detection and the RMS value is taken. This error is in pixels and can be computed for each camera of each camera pair.

Other Calibration Method and System Implementations

Figure 15:
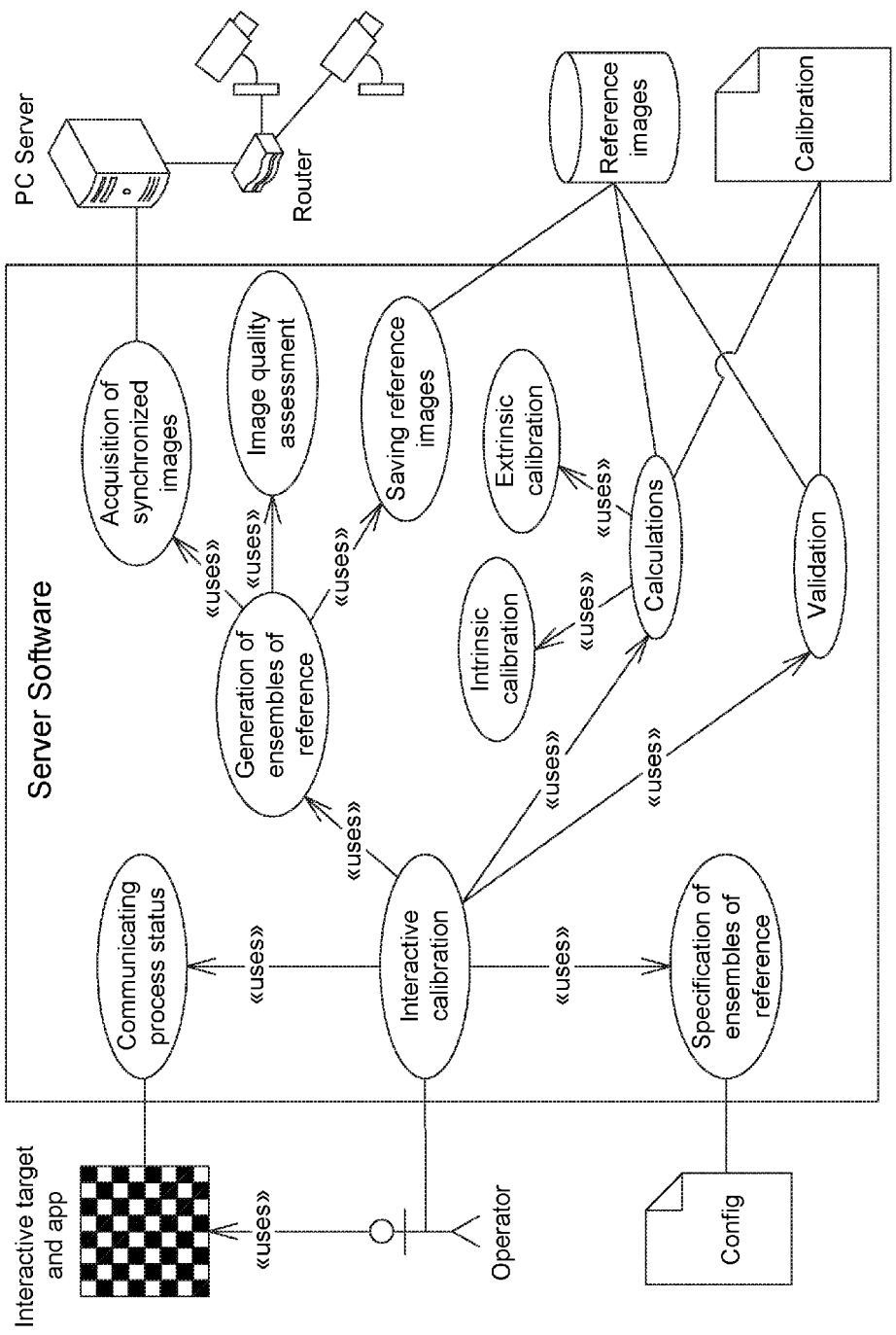
FIG. 15 illustrates a schematic diagram of a live-mode implementation of the camera calibration, in accordance with an embodiment.

Referring to FIG. 15, in some implementations, various steps of the calibration methods described above can be performed substantially concurrently, corresponding in a live-mode implementation. Concurrent steps can include the acquisition, detection and qualification of target poses; the assignment of qualified target poses as reference images into volume, angle and multi-camera bins; the camera calibration itself; and the validation of the calibration results.

Figure 16A:
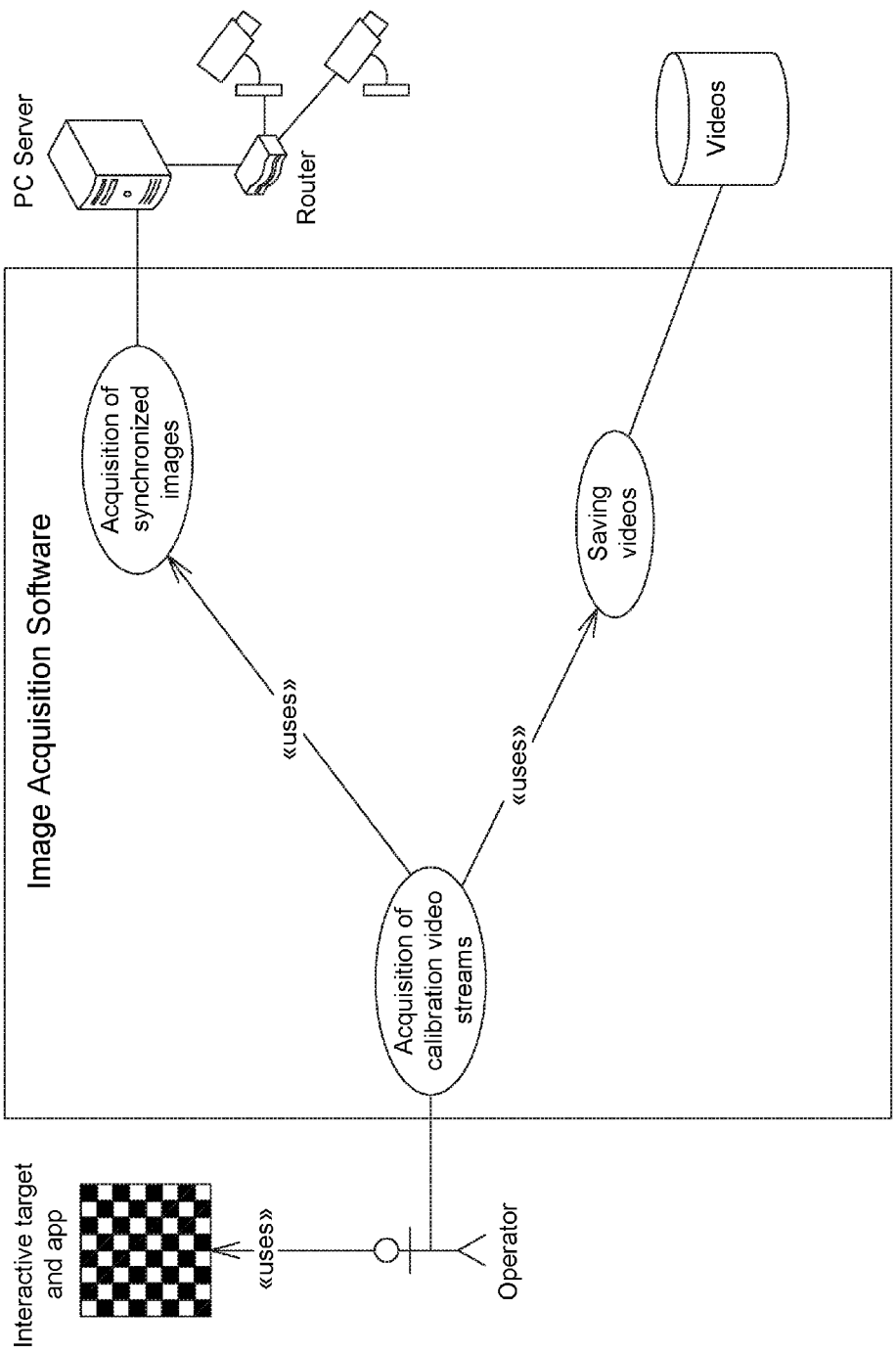
FIGS. 16A and 16B illustrate schematic diagrams of an off-line-mode implementation of the camera calibration, in accordance with an embodiment.
Figure 16B:
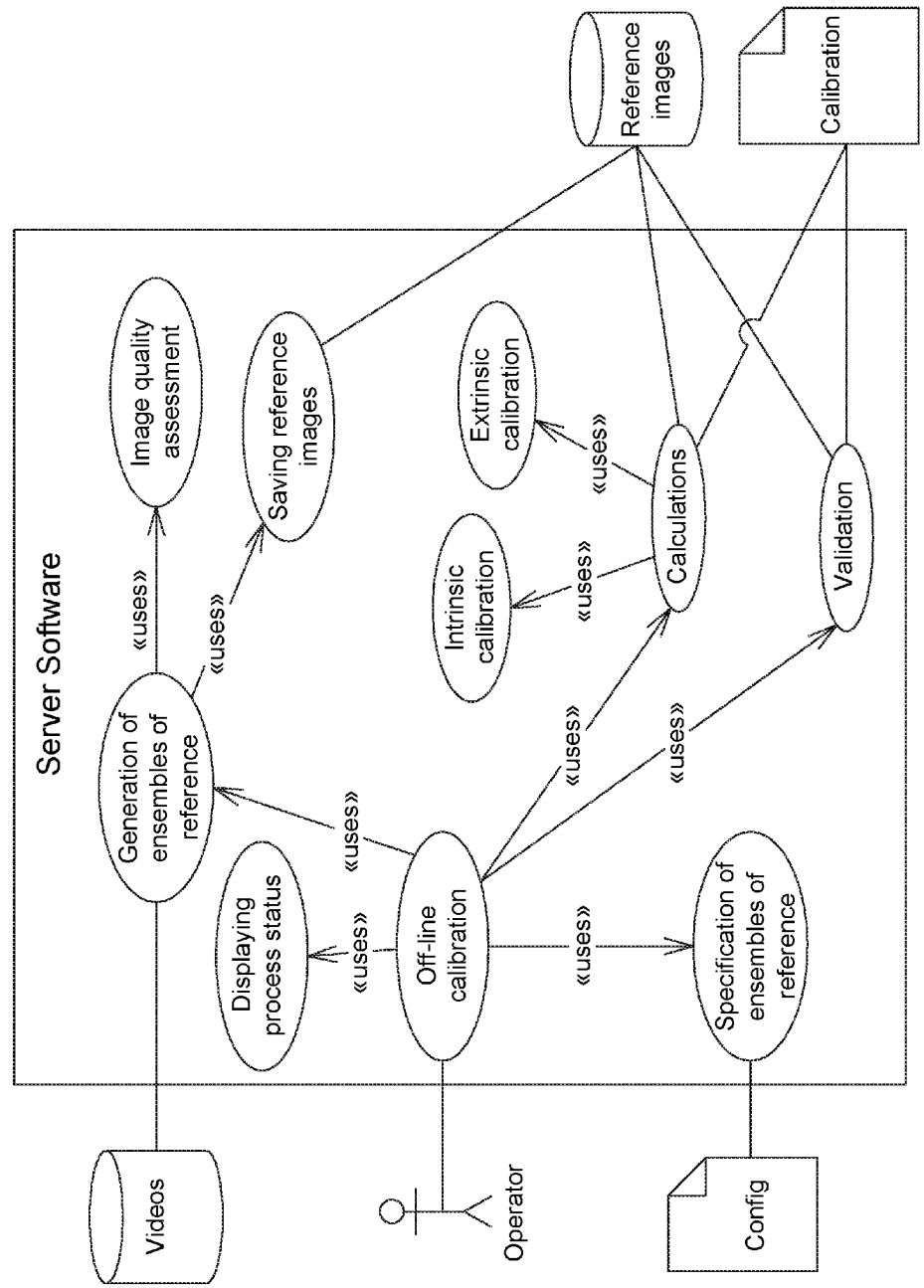

However, in other implementations, some steps of the calibration process described above can be performed "off-line", after the acquisition of the target poses. For example, in FIGS. 16A and 16B, raw target poses are first acquired and stored (FIG. 16A). Then, at a subsequent time, the raw target poses can be analyzed, qualified and assigned to the different bins as reference images and, concurrently or subsequently, the intrinsic and extrinsic camera parameters can be estimated and validated (FIG. 16B).

In yet other implementations, the image acquisition and analysis process can first be performed to provide and store a set of reference images for each of the cameras. Then, at a subsequent time, the sets of reference images can be used to calibrate the cameras and to validate the calibration results.

Figure 17:
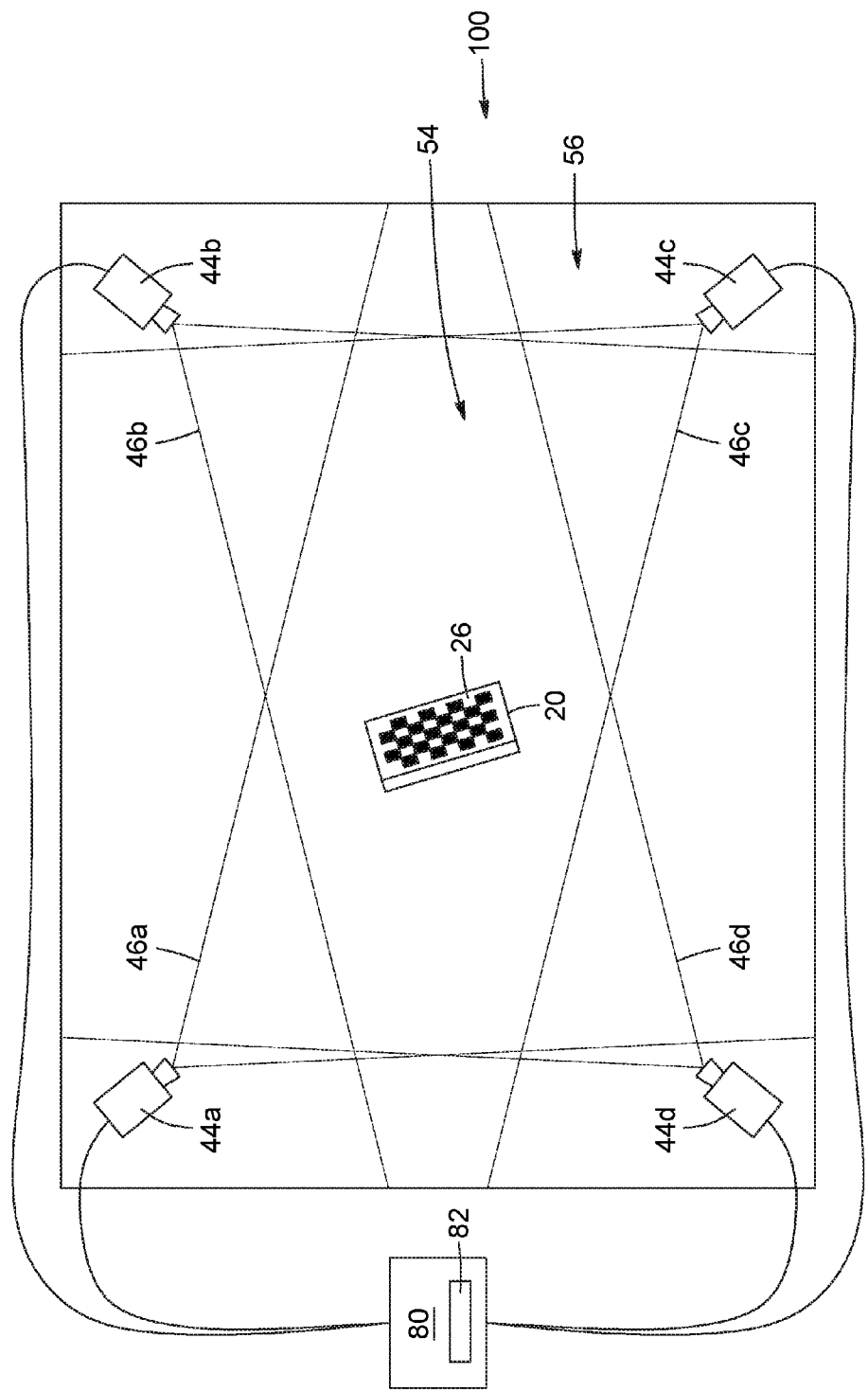
FIG. 17 is a schematic representation of a camera calibration system, in accordance with an embodiment.

Referring to FIG. 17, in accordance with another aspect, there is provided a camera calibration system 100. The system 100 can include: a network 56 of cameras 44a to 44d disposed relative to a real-world scene 54 to provide a corresponding plurality of images or video streams of the real-world scene 54 from a plurality of physical viewpoints; a calibration target 20 having a calibration pattern 26, for example a planar checkerboard calibration pattern such as described above; and a processing unit 80 operatively connected (i.e. via wired and/or wireless connections) to each one of the cameras 44a to 44d and configured to receive therefrom the video streams of the real-world scene 54. The processing unit 80 can include or be coupled to a computer readable memory 82 storing computer executable instructions thereon that, when executed by the processing unit 80 can perform various steps of the calibration methods described herein (see, e.g., FIGS. 6 and 13). Such steps can include, without limitation, defining volume, angle and multi-camera bins as defined above; acquiring, identifying and qualifying target images for various poses of a calibration target 20; assigning the qualified target poses as reference images in the various volume, angle and multi-camera bins; performing camera calibration to estimate the intrinsic and extrinsic parameters of the various cameras 44a to 44d; and validating the calibration results.

As used herein, the term "processing unit" refers broadly to any computing or processing device or combination of devices including electronic circuitry that can control and execute, at least partly, instructions required to perform various steps of the methods and processes disclosed herein. The computer can be embodied by a general-purpose computer, a central processing unit (CPU), a microprocessor, a microcontroller, a processing core, or any other processing resource or any combination of such computer or processing resources configured to operate collectively as a processing unit. The processing unit may be provided within one or more general purpose computers and/or within any other suitable computing devices. Also, the processing unit can be implemented in hardware, software, firmware, or any combination thereof, and be connected to various components of the calibration system via appropriate communication ports. In some implementations, the processing unit can be equipped with high-performance and flexible computing architecture appropriate for multi-camera acquisitions. In some embodiments, the processing unit can be located on the same site as the real-world scene, while in other embodiments the processing unit may be located at a site remote from the real-world scene.

As used herein, the term "computer readable memory" is intended to refer to a non-transitory and tangible computer product that can store and communicate executable instructions for performing various steps of the image analysis and camera calibration processes described herein. The computer readable memory can be embodied by any computer data storage device or assembly of such devices including, for example: a temporary storage unit such as a random-access memory (RAM) or dynamic RAM; a permanent storage such as a hard disk; an optical storage device, such as a CD or DVD (rewritable or write once/read only); a flash memory; and/or other non-transitory memory technologies. A plurality of such storage devices may be provided, as can be understood by one of ordinary skill in the art.

Of course, numerous modifications could be made to the embodiments described above without departing from the scope of the appended claims.

The invention claimed is:

1. A method for intrinsic calibration of a camera using a calibration target, the camera having a field of view covering a scene, the method comprising the steps of:

providing a plurality of target images acquired with the camera, each target image representing a view of the calibration target in a respective one of a plurality of target poses, each target pose corresponding to a certain location and orientation of the calibration target relative to the camera; the providing step comprising acquiring, with the camera, the plurality of target images of the calibration target in the respective plurality of target poses; and displacing the calibration target between acquiring successive ones of the plurality of target images;

measuring, during the providing step, at least one of location information and orientation information about the calibration target with at least one sensor mounted on the calibration target;

partitioning a volume of interest of the scene into a set of volume bins;

defining a set of angle bins, each angle bin encompassing a respective range of possible orientation values for the calibration target;

identifying, among the plurality of target images, reference images of the calibration target;

assigning each reference image to either or both of one of the volume bins and one of the angle bins based on the respective target pose corresponding to the reference image; the assigning step comprising determining at least one of the location and the orientation of the calibration target corresponding to each reference image based on the at least one of the location information and orientation information measured by the at least one sensor; and obtaining intrinsic camera parameters based on the reference images.

2. The method of claim 1, further comprising a step of monitoring, in real-time, a current number of reference images assigned to each one of the volume bins and each one of the angle bins.

3. The method of claim 2, further comprising a step of communicating filling-level information related to the current numbers of reference images assigned to the volume and angle bins.

4. The method of claim 3, wherein the displacing step is performed based on the filling-level information.

5. The method of claim 3, wherein the communicating step comprises displaying the filling-level information on a visual display mounted on the calibration target.

6. The method of claim 1, wherein the providing, identifying and assigning steps are performed until, for each one of the volume bins and each one of the angle bins, the current number of assigned reference images reaches a respective predetermined threshold amount.

7. The method of claim 1, wherein the obtaining step comprises a step of determining a calibration error associated with the intrinsic camera parameters, and wherein the providing, identifying, assigning and obtaining steps are stopped if the calibration error gets lower than a predetermined error value.

8. The method of claim 1, wherein the providing, identifying and assigning steps are performed at least partly concurrently with one another.

9. The method of claim 1, wherein the obtaining step is performed iteratively and at least partly concurrently with the providing, identifying and assigning steps.

10. The method of claim 1, further comprising preliminary steps of:
acquiring a series of initial images of the calibration target at different initial target poses; and
obtaining initial estimates for the intrinsic camera parameters based on the series of initial images.

11. The method of claim 1, wherein, for at least one of the target images, the identifying step comprises:
searching the calibration target in the target image;
if the calibration target is found, evaluating at least one image quality parameter of the target image; and
if each image quality parameter meets a respective quality criterion, classifying the target image as one of the reference images.

12. The method of claim 11, wherein the searching step comprises looking for one or more fiducial features present on the calibration target.

13. The method of claim 1, wherein the assigning step comprises, for at least one of the reference images, determining the respective target pose based on a pixel-based location of the calibration target in the reference image.

14. A method for extrinsic calibration of a network of cameras using a calibration target, each camera of the network having a field of view that covers a portion of a scene and partially overlaps the field of view of at least another camera of the network, the method comprising the steps of:
providing, for each camera, a plurality of target images acquired with the camera, each target image representing a view of the calibration target in a respective one of a plurality of target poses and at a respective one of a plurality of acquisition times;
defining at least one multi-camera bin, each multi-camera bin being associated with two or more of the cameras of the network, the two or more cameras having partially overlapping fields of view;
identifying, for each camera, qualified target images among the plurality of target images; for each multi-camera bin:
assigning sets of multi-camera reference images to the multi-camera bin, the multi-camera reference images in each set having a same acquisition time and consisting of one of the qualified target images acquired by each one of the two or more associated cameras; and
obtaining, for each one of the two or more associated cameras and based on the multi-camera reference images, estimates of extrinsic camera parameters in a bin reference frame associated with the multi-camera bin; and
if the at least one multi-camera bin consists of more than one multi-camera bin, obtaining, for each camera of the network and based on the estimates of the extrinsic camera parameters obtained for every camera of the network, calibrated values of the extrinsic camera parameters in a same global reference frame; otherwise, using, for each camera of the network, the estimates of the extrinsic camera parameters as the calibrated values of the extrinsic camera parameters.

15. The method of claim 14, wherein the providing step is performed at least partly concurrently for all cameras of the network and comprises, for each camera, the steps of:
acquiring, with the camera, the plurality of target images of the calibration target; and
displacing the calibration target between acquiring successive ones of the plurality of target images.

16. The method of claim 15, further comprising, during the providing step, a step of measuring at least one of location information and orientation information about the calibration target with at least one sensor mounted on the calibration target, and wherein, for each multi-camera bin, the assigning step comprises assigning the sets of multi-camera reference images to the multi-camera bin based on the at least one of the location information and orientation information measured by the at least one sensor.

17. The method of claim 15, further comprising a step of monitoring, in real-time, a current number of sets of multi-camera reference images assigned to each multi-camera bin.

18. The method of claim 17, further comprising a step of communicating filling-level information related to the current number of sets of multi-camera reference images assigned to each multi-camera bin.

19. The method of claim 18, wherein the communicating step comprises displaying the filling-level information on a visual display mounted on the calibration target.

20. The method of claim 15, wherein, for each multi-camera bin, the providing, identifying and assigning steps are performed at least partly concurrently with one another.

21. The method of claim 14, further comprising the steps of:
- assigning, for each multi-camera bin, sets of validation images to the multi-camera bin, the validation images in each set having a same acquisition time and consisting of one of the qualified target images acquired by each one of the two or more associated cameras, the validation images being different from the multi-camera reference images; and
- validating the calibrated values of the extrinsic camera parameters based on the validation images.

22. The method of claim 14, wherein each multi-camera bin is a two-camera bin associated with two of the cameras of the network.

23. The method of claim 14, wherein the network of cameras includes more than two cameras.

24. The method of claim 14, further comprising, for each camera, a step of determining intrinsic camera parameters, comprising the steps of:
- partitioning a volume of interest of the scene into a set of volume bins;
- defining a set of angle bins, each angle bin encompassing a respective range of possible orientation values for the calibration target;
- identifying, among the qualified target images, single-camera reference images of the calibration target;
- assigning each single-camera reference image to either or both of one of the volume bins and one of the angle bins based on the respective target pose corresponding to the single-camera reference image; and
- obtaining the intrinsic camera parameters based on the single-camera reference images.

25. A non-transitory computer readable memory storing computer executable instructions, wherein when executed by a computer, the instructions perform the method of claim 14.

* * * * *